United States Patent
Yuan et al.

(10) Patent No.: US 10,826,557 B2
(45) Date of Patent: Nov. 3, 2020

(54) DATA TRANSMISSION METHOD, TRANSMITTER, RECEIVER, STORAGE MEDIUM

(71) Applicant: ZTE CORPORATION, Shenzhen (CN)

(72) Inventors: Zhifeng Yuan, Shenzhen (CN); Weimin Li, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 16/470,103

(22) PCT Filed: Nov. 30, 2017

(86) PCT No.: PCT/CN2017/114147
§ 371 (c)(1),
(2) Date: Jun. 14, 2019

(87) PCT Pub. No.: WO2018/107980
PCT Pub. Date: Jun. 21, 2018

(65) Prior Publication Data
US 2020/0052838 A1 Feb. 13, 2020

(30) Foreign Application Priority Data
Dec. 16, 2016 (CN) .......................... 2016 1 1170041

(51) Int. Cl.
*H04B 1/707* (2011.01)
*H04L 5/00* (2006.01)
(Continued)

(52) U.S. Cl.
CPC .......... *H04B 1/707* (2013.01); *H04L 5/0007* (2013.01); *H04L 5/0044* (2013.01);
(Continued)

(58) Field of Classification Search
CPC ... H04L 5/0007; H04L 5/0044; H04L 5/0048; H04L 5/0055; H04L 1/1671;
(Continued)

(56) References Cited

U.S. PATENT DOCUMENTS

2014/0078944 A1* 3/2014 Yang ................. H04L 1/0073
370/280
2014/0140292 A1 5/2014 Yoshizawa
(Continued)

FOREIGN PATENT DOCUMENTS

| CN | 105991159 A | 10/2016 |
|---|---|---|
| WO | 2011126239 A3 | 10/2011 |

OTHER PUBLICATIONS

Huawei, "Requirements on random access procedure in NR," 3GPP TSG-RAN WG2 Meeting #95bis, Oct. 10-14, 2016. 3 pages.
(Continued)

*Primary Examiner* — Dady Chery
(74) *Attorney, Agent, or Firm* — Cantor Colburn LLP

(57) ABSTRACT

Disclosed in the embodiments of the present invention is a data transmission method. The method includes: a transmitter transmitting, on a first time frequency resource region, transmission signals that are generated from a bit sequence B using at least a symbol extension technology; the extension sequence used by the symbol extension technology being the Index1-th sequence of a sequence set containing K1 extension sequences, the Index1-th characterizing the first index value; the transmitter using part of the bits of the bit sequence B and a bit sequence B0 as a bit sequence B2, and transmitting, over the Index2-th sub-resource pool of a second time frequency resource region containing K2 sub-resource pools, transmission signals generated on the basis of the bit sequence B2; the Index2-th characterizing a second index value; the first index value Index1 and the
(Continued)

second index value Index2 both being determined according to the bit sequence B0.

19 Claims, 21 Drawing Sheets

(51) Int. Cl.
*H04W 72/12* (2009.01)
*H04W 72/14* (2009.01)
*H04W 74/08* (2009.01)
*H04W 12/08* (2009.01)

(52) U.S. Cl.
CPC .......... *H04L 5/0048* (2013.01); *H04L 5/0055* (2013.01); *H04W 12/08* (2013.01); *H04W 72/1268* (2013.01); *H04W 72/1284* (2013.01); *H04W 72/14* (2013.01); *H04W 74/0833* (2013.01)

(58) Field of Classification Search
CPC .............. H04L 5/0053; H04L 27/2626; H04L 27/2647; H04L 27/2602; H04L 1/004; H04L 1/0061; H04L 1/1607; H04W 72/044; H04W 72/1268; H04W 72/1284; H04W 72/14; H04W 74/0833; H04W 12/08; H04J 13/00; H04J 13/0077; H04B 1/707

See application file for complete search history.

(56) References Cited

U.S. PATENT DOCUMENTS

| | | | |
|---|---|---|---|
| 2015/0289292 A1 | 10/2015 | Sun | |
| 2017/0295601 A1* | 10/2017 | Kim | H04L 5/0092 |
| 2019/0159153 A1* | 5/2019 | Li | H04W 56/0015 |
| 2019/0223204 A1* | 7/2019 | Kim | H04W 72/14 |

OTHER PUBLICATIONS

ZTE Corporation, "Random access in NR" 3GPP TSG RAN WG2 Meeting #96, Nov. 14-18, 2016. 9 pages.

International Search Report; International Application No. EP 17881062.8; International Filing Date Nov. 30, 2017; dated Nov. 21, 2019; 10 pages.

Samsung, "Discussion on simplified RACH procedure," 3GPP TSG-RAN WG1 Meeting 87, Nov. 14-18, 2016. 5 pages.

* cited by examiner

Second time-frequency resource area (also called data preamble area) occupying 4 ms, 16 orthogonal sub-regions First time-frequency resource area occupying 16 ms, 4 long spreading sequences Second time-frequency resource area
(also called data preamble area)
occupying 4 ms, 16 orthogonal sub-regions First time-frequency resource area
occupying 12 ms, 4 long spreading sequences

DATA TRANSMISSION METHOD, TRANSMITTER, RECEIVER, STORAGE MEDIUM

CROSS REFERENCE

This application is a continuation application, under 35 U.S.C. § 371, of PCT Application No. PCT/CN2017/114147 filed Nov. 30, 2017, which is based upon and claims priority to Chinese Patent Application No. 201611170041.0, filed on Dec. 16, 2016 the entire contents thereof are incorporated herein by reference.

TECHNICAL FIELD

The present disclosure relates to the field of radio communication technologies, and more particularly, to a data transmission method, a transmitter, a receiver, and a storage medium.

BACKGROUND

FIG. 1 is a flow schematic diagram of implementing conventional 4-step random access method; as shown in FIG. 1, a user equipment (UE) sends a Random Access Preamble to an eNode B (Evolved Node B), and the eNode B feeds back Random Access Response to the UE, and then, the UE sends L2/L3 message to the eNode B, and the eNode B feeds back message for early contention resolution to the UE to complete a random access process. Here, although the 4-step random access method has high reliability, great delay and large system resource overhead. Moreover, since the existing random access process is prone to events in which different users select the same preamble to cause a preamble collision, the existing random access process brings uncertainty to the demodulation.

SUMMARY

In order to solve the existing technical problems, embodiments of the present disclosure provide a data transmission method, a transmitter, a receiver, and a storage medium.

In order to achieve the above object, the technical solution of the embodiment of the present disclosure is implemented as follows:

The first aspect of the disclosure provides a data transmission method, and the method includes:

transmitting, by a transmitter, transmission signals, that are generated from a bit sequence B using at least a symbol spreading technology, on a first time-frequency resource region; wherein, a spreading sequence used by the symbol spreading technology is an Index1-th sequence in a sequence set containing K1 spreading sequences, and the Index1-th represents a first index value; and using, by the transmitter, partial bits of the bit sequence B and a bit sequence B0 as a bit sequence B2, and transmitting transmission signals generated based on the bit sequence B2 on an Index2-th sub-resource pool in a second time-frequency resource region containing K2 sub-resource pools; the Index2-th representing a second index value; wherein, the first index value Index1 and the second index value Index2 are both determined by the bit sequence B0; and the bit sequence B0 is determined according to the bit sequence B, or is determined jointly according to the bit sequence B and system parameter information associated with current transmission process.

The second aspect of the disclosure provides a data transmission method, and the method includes:

receiving, by a receiver, transmission signals transmitted by at least one of transmitters on a first time-frequency resource region and a second time-frequency resource region, and extracting bit sequence B and bit sequence B2 corresponding to each of the transmitters based on the transmission signals transmitted by each of the transmitters on the first time-frequency resource region and the second time-frequency resource region; and;

determining feedback information for each of the transmitters based on reconstructed signals of the bit sequence B and/or the bit sequence B2 corresponding to each of the transmitters, and transmitting the feedback information for each of the transmitters; wherein, the feedback information includes at least terminal identity identification information, uplink synchronization alignment timing advance TA information, and a temporary identifier allocated to a cell where a terminal locates after contention resolution; or, at least includes the terminal identity identification information, the uplink synchronization alignment timing advance TA information, the temporary identifier allocated to the cell where the terminal locates after the contention resolution, and uplink grant assigned for subsequent data of the transmitter; or, at least includes the terminal identity identification information and an acknowledgement ACK/negative acknowledgement NACK; or, at least includes the terminal identity identification information and the acknowledgement ACK/negative acknowledgement NACK, the temporary identifier allocated to the cell where the terminal locates after the contention resolution, and the uplink grant assigned for subsequent data of the transmitter.

The third aspect of the disclosure provides a transmitter, and the method includes:

a first sending unit, configured to transmit transmission signals, that are generated from a bit sequence B using at least a symbol spreading technology, on a first time-frequency resource region; wherein, a spreading sequence used by the symbol spreading technology is an Index1-th sequence in a sequence set containing K1 spreading sequences, and the Index1-th represents a first index value; and a second sending unit, configured to use partial bits of the bit sequence B and a bit sequence B0 as a bit sequence B2, and transmitting transmission signals generated based on the bit sequence B2 on an Index2-th sub-resource pool in a second time-frequency resource region containing K2 sub-resource pools; the Index2-th representing a second index value; wherein, the first index value Index1 and the second index value Index2 are both determined by the bit sequence B0; and the bit sequence B0 is determined according to the bit sequence B, or is determined jointly according to the bit sequence B and system parameter information associated with current transmission process.

The fourth aspect of the disclosure provides a transmitter, and the method includes:

a first receiving unit, configured to receive transmission signals transmitted by at least one of transmitters on a first time-frequency resource region and a second time-frequency resource region;

a second processing unit, configured to extract bit sequence B and bit sequence B2 corresponding to each of the transmitters based on the transmission signals transmitted by each of the transmitters on the first time-frequency resource region and the second time-frequency resource region; and determine feedback information for each of the transmitters based on reconstructed signals of the bit sequence B and/or the bit sequence B2 corresponding to each of the transmitters; and a third sending unit, configured to transmit the feedback information for each of the transmitters; wherein, the feedback information includes at least terminal identity identification information, uplink synchronization alignment timing advance TA information, and a temporary identifier allocated to a cell where a terminal locates after contention resolution; or, at least includes terminal identity identification information, uplink synchronization alignment timing advance TA information, a temporary identifier allocated to a cell where a terminal locates after contention resolution, and uplink grant assigned for subsequent data of the transmitter; or, at least includes terminal identity identification information and an acknowledgement ACK/negative acknowledgement NACK; or, at least includes terminal identity identification information and an acknowledgement ACK/negative acknowledgement NACK, a temporary identifier allocated to a cell where a terminal locates after contention resolution, and uplink grant assigned for subsequent data of the transmitter.

A fifth aspect of an embodiment of the present disclosure provides a first computer storage medium, the first computer storage medium stores a computer program and a spreading sequence set, the computer program is configured to perform the foregoing data transmission method applied to a transmitter.

A sixth aspect of an embodiment of the present disclosure provides a second computer storage medium, the second computer storage medium stores a computer program, the computer program is configured to perform the foregoing data transmission method applied to a receiver.

A seventh aspect of an embodiment of the present disclosure provides a transmitter including: a processor and a memory for storing a computer program executable on the processor, wherein, when the computer program is executed by the processor for performing the above steps of methods applied to the transmitter.

An eighth aspect of an embodiment of the present disclosure provides a receiver including: a processor and a memory for storing a computer program executable on the processor, wherein, when the computer program is executed by the processor for performing the above steps of methods applied to the receiver.

A data transmission method, a transmitter, a receiver and a storage medium are described in embodiments of present disclosure, that is, by optimizing the structure of the random access frame, the delay and overhead of the two scenarios of random access and small packet data transmission could be effectively reduced, at the same time, implementation of the transmitter and the receivers could be simplified, the blind detection efficiency of the receiver and the success rate of blind detection could be improved, moreover, the method described in the embodiments of the present disclosure has excellent robust performance.

BRIEF DESCRIPTION OF THE DRAWINGS

In the drawings (which are not necessarily drawn to scale), similar reference numbers may be used to describe similar elements in different views. Similar reference numerals containing different letter extensions may indicate different examples of similar elements. The drawings generally illustrate the various embodiments discussed herein by way of example and not limitation.

DETAILED DESCRIPTION

Figure 1:
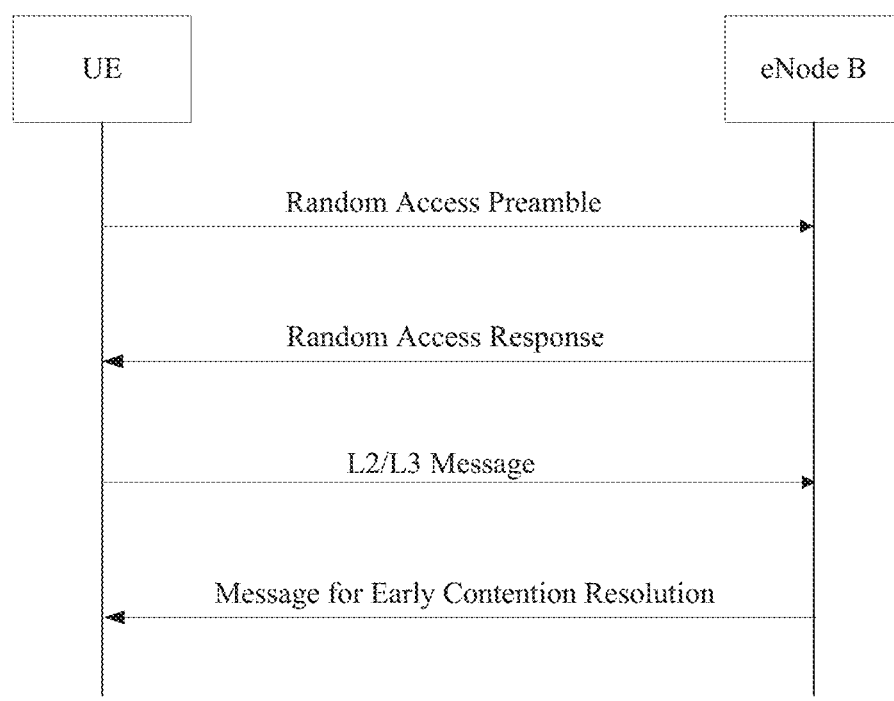
FIG. 1 is a flow schematic diagram illustrating a implementation flow of a conventional 4-step random access method.
Figure 2:
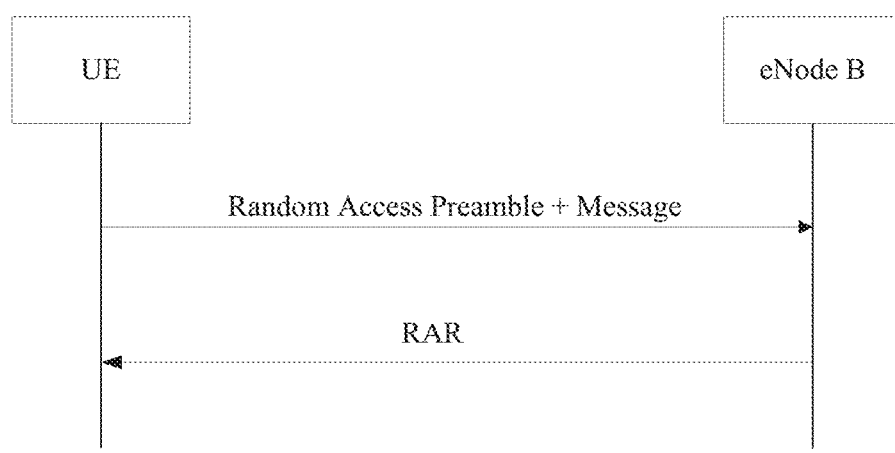
FIG. 2 is a flow schematic diagram illustrating a implementation flow of a 2-step random access method.

FIG. 2 is a flow schematic diagram illustrating a implementation flow of a 2-step random access method; as shown in FIG. 2, a UE sends a random access preamble+message (mainly including terminal identity identification information, or further including a uplink scheduling request (SR)/a buffer status report (BSR)) to an eNode B, the eNode B feeds back RAR to the UE based on the received random access preamble+message; here, the eNode B obtains information reported by user based on preamble detection and demodulation decoding of the "message", and the information reported by user is carried in RAR to provide feedback, wherein, the information reported by user carried in RAR usually includes three specific information, namely, uplink Timing Advance (TA) information, contention resolution information which is Cell Radio Network Temporary Identifier (C-RNTI) assigned to the UE usually after the contention resolution, and Uplink grant assigned for subsequent data of a terminal, i.e., UL Grant (for Buffer Data). Here, although the 2-step could reduce access delay compared to the 4-step as shown in FIG. 1, the first step of "preamble+ message" in the 2-step, once multiple users select the same preamble, that is, preamble collision, the latter data will also be aliased together and interfere with each other, thus, uncertainty will be brought to demodulation inevitably. Moreover, once the number of random access concurrent users is large, the reliability of the 2-step is degraded. Therefore, the 2-step random access method as shown in FIG. 2 is only applicable to scenarios with fewer concurrent users.

Figure 3:
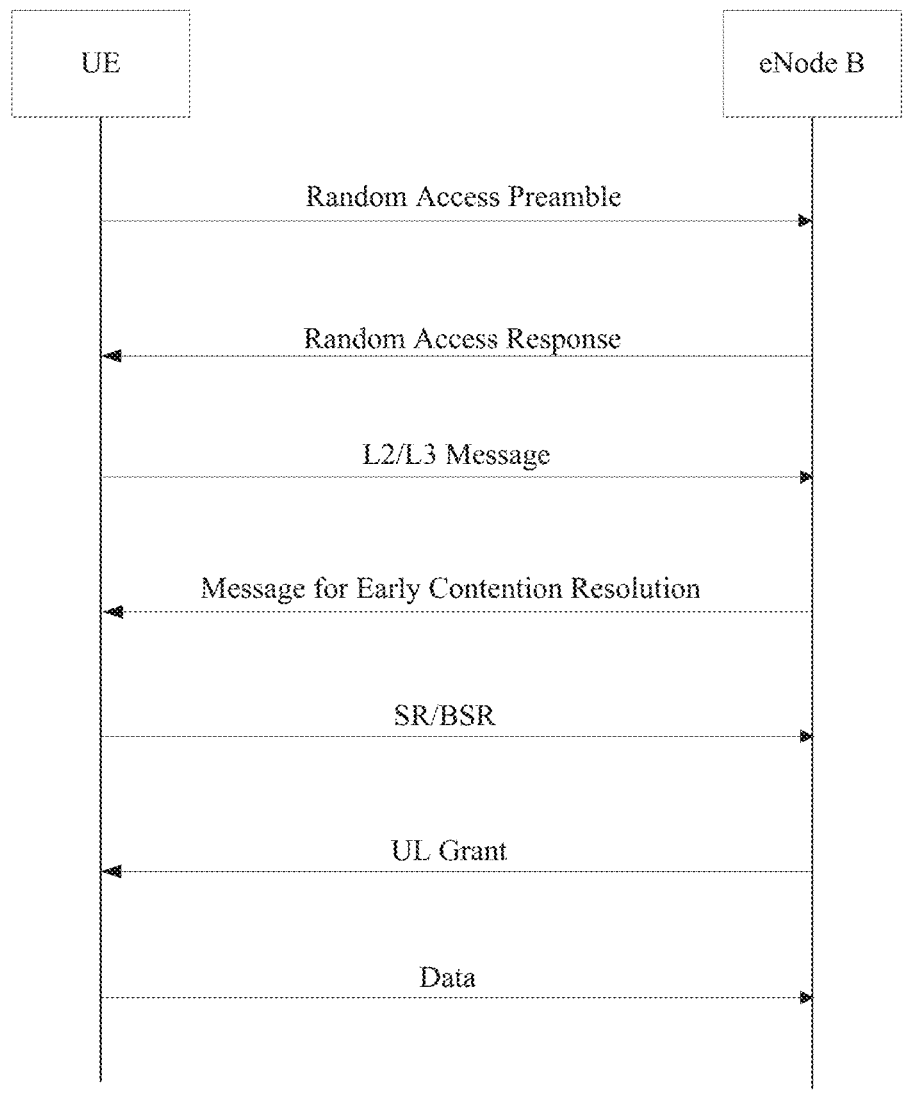
FIG. 3 is a flow schematic diagram illustrating a implementation flow of a data transmission method for a UE in non-connected state.

Further, in practical application, a UE in non-connected state is required to go through the random access process similar to that shown in FIG. 1, and after contention is resolved successfully, the UE obtains a unique identity in a certain cell, and then further obtains UL grant allocated by this cell, that is, certain uplink time-frequency resources, such as PUSCH in the LTE standards, then the UE could send data. Specifically, FIG. 3 is a flow schematic diagram illustrating a implementation flow of a data transmission method for a UE in non-connected state, as shown in FIG. 3, after receiving message for early contention resolution, the UE sends SR/BSR to the eNode B, the eNode B sends UL grant to the UE, then the UE could send data, thus, spectral efficiency and energy efficiency are too low for a scenario of incidental small package in massive Internet of Things. Therefore, in order to solve the problem that the above 2-step random access method is prone to preamble collision and data transmission method is not suitable for the scenario of incidental small package in massive Internet of Things, the embodiments of the present disclosure provide a fast and efficient transmission method, that is, by optimizing the structure of the random access frame, the delay and overhead of the two scenarios of random access and small packet data transmission could be effectively reduced, at the same time, implementation of a transmitter and a receivers could be simplified, the blind detection efficiency of the receiver and the success rate of blind detection could be improved, moreover, the method described in the embodiments of the present disclosure has excellent robust performance.

In order to understand the features and technical contents of the present disclosure in more detail, the implementation of the present disclosure will be described in detail below with reference to the accompanying drawings. The attached drawings are illustrative only and are not intended to limit the disclosure.

The First Embodiment

Figure 4:
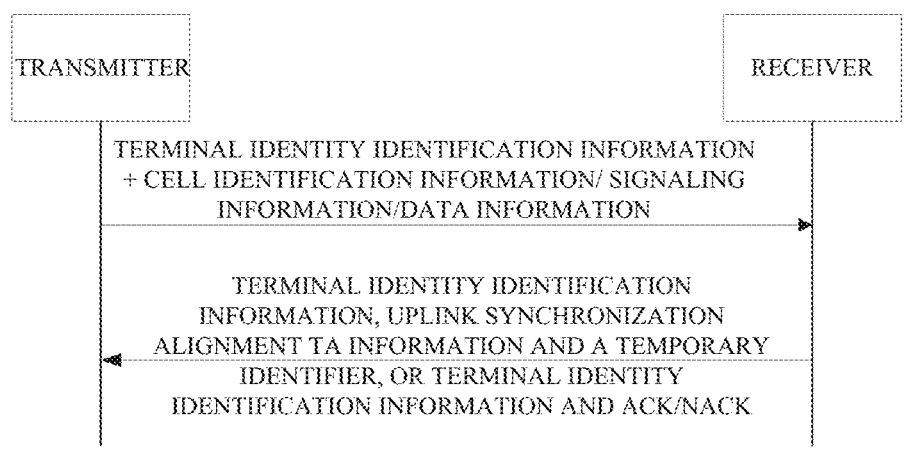
FIG. 4 is a flow schematic diagram illustrating a implementation flow of a data transmission method according to the first embodiment of present disclosure.
Figure 5:
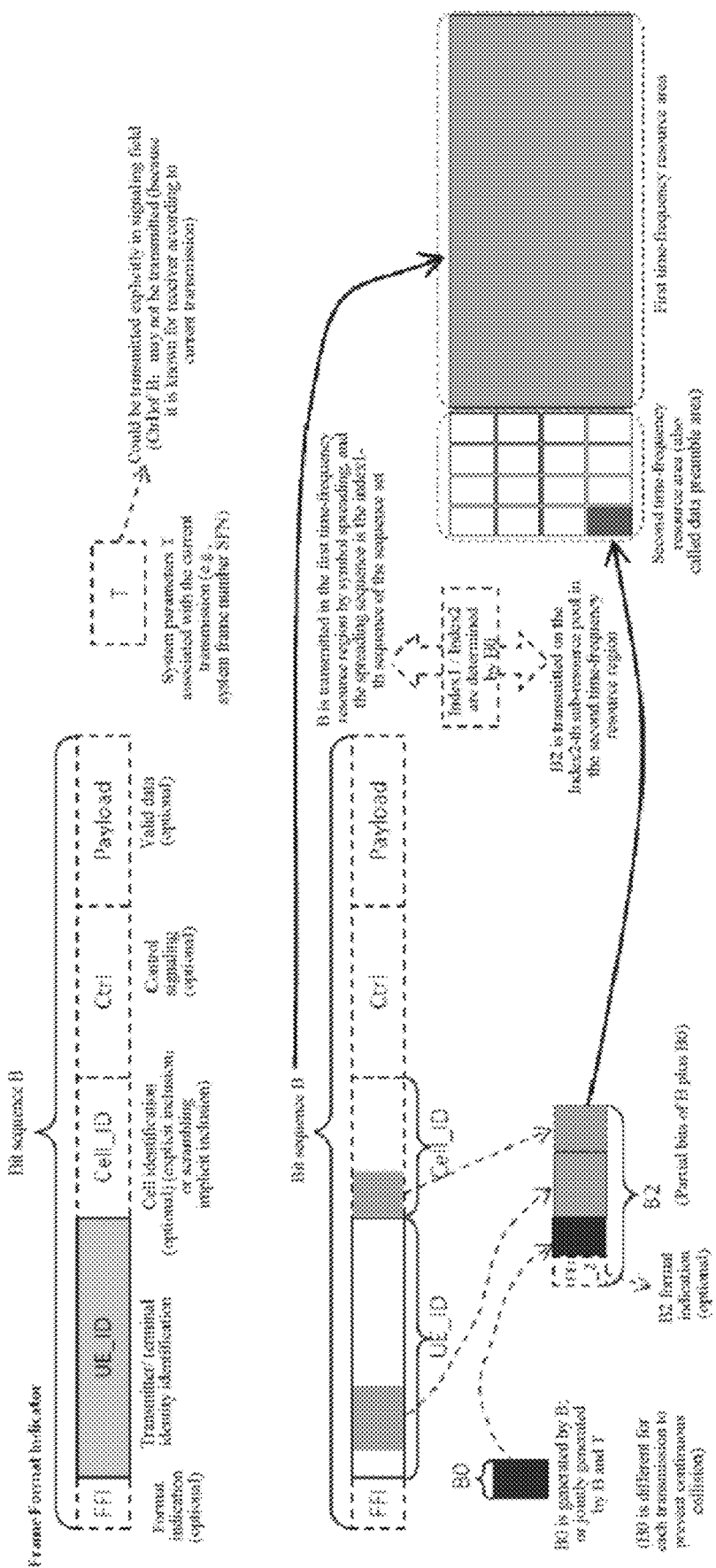
FIG. 5 is a diagram showing a detailed structure of a bit sequence B according to an embodiment of present disclosure.
Figure 5:
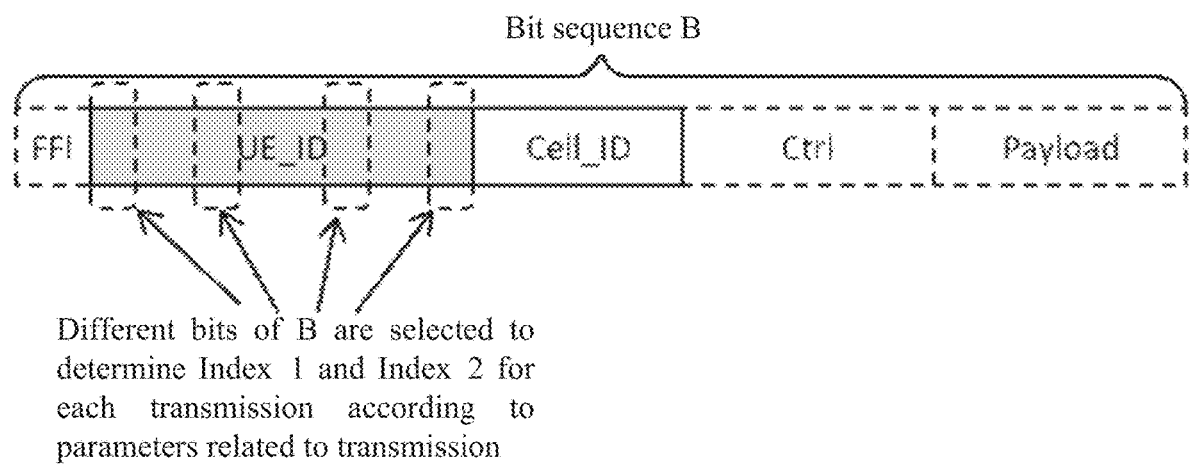

This embodiment provides a data transmission method, as shown in FIG. 4 and FIG. 5(*a*), the method includes steps 101-102.

In step 101, a transmitter transmits transmission signals, that are generated from a bit sequence B using a symbol spreading technology at least, on a first time-frequency resource region; wherein, a spreading sequence used by the symbol spreading technology is an Index1-th sequence in a sequence set containing K1 spreading sequences, the Index1-th represents a first index value.

Specifically, the transmitter sends the transmission signals that are formed by the bit sequence B using the symbol spreading technology at one time, and the transmitter transmits the transmission signals formed based on the bit sequence B on the first time-frequency resource region; further, as shown in FIG. 5, partial bits of the bit sequence B are a bit sequence B2, transmission signals generated based on the bit sequence B2 are also transmitted on the Index2-th sub-resource pool in a second time-frequency resource region which is divided into K2 sub-resource pools. Here, the first index value Index1 and the second index value Index2 are both determined by the bit sequence B0. The bit sequence B0 is generated from the bit sequence B or is jointly generated from the bit sequence B and the system parameter information T associated with the current transmission.

In the step 102, the transmitter uses partial bits of the bit sequence B and a bit sequence B0 as a bit sequence B2, and transmits transmission signals generated based on the bit sequence B2 on an Index2-th sub-resource pool in a second time-frequency resource region containing K2 sub-resource pools; the Index2-th represents a second index value; wherein, the first index value Index1 and the second index value Index2 are both determined by the bit sequence B0; the bit sequence B0 is determined according to the bit sequence B, or is determined jointly according to the bit sequence B and system parameter information associated with the current transmission process.

Here, in practical application, a receiver receives the transmission signals transmitted by at least one of transmitters on the first time-frequency resource region and the second time-frequency resource region, the bit sequence B and the bit sequence B2 corresponding to each of the transmitters are extracted based on the transmission signals transmitted by each of the transmitters on the first time-frequency resource region and the second time-frequency resource region; feedback information for each of the transmitters is determined based on reconstructed signals of the bit sequence B and/or the bit sequence B2 corresponding to each of the transmitters, and the feedback information for each of the transmitters is transmitted; wherein, the feedback information includes at least terminal identity identification information, uplink synchronization alignment timing advance TA information, and a temporary identifier allocated to a cell where a terminal locates after contention resolution; or, at least includes terminal identity identification information, uplink synchronization alignment timing advance TA information, a temporary identifier allocated to a cell where a terminal locates after contention resolution, and uplink grant assigned for subsequent data of the transmitter; or, at least includes terminal identity identification information and an acknowledgement ACK/negative acknowledgement NACK; or, at least includes terminal identity identification information and an acknowledgement ACK/negative acknowledgement NACK, a temporary identifier allocated to a cell where a terminal locates after contention resolution, and uplink grant assigned for subsequent data of the transmitter.

In this embodiment, the transmitter may be specifically a user equipment, and the receiver may be specifically a base station, such as an eNode B.

In a specific embodiment, as shown in FIG. 5, the bit sequence B transmitted on the first time-frequency resource region includes terminal identity identification information or transmitter identity identification information; or includes terminal identity identification information and at least one of the following information: cell identification information, signaling information and data information; or includes transmitter identity identification information and at least one of the following information: cell identification information, signaling information and data. Namely, as shown in FIG. 5, the bit sequence B transmitted on the first time-frequency resource region must include terminal identity identification information or transmitter identity identification information, or further includes cell identification information (optional), and control signaling (optional) and data (optional). Here, the optional means that it may or may not be included.

Here, it should be noted that in data transmission scenario of UE in the non-connected state, the transmission information must include data.

In a specific embodiment, the system parameter information includes at least one of the following information: a system frame number (SFN) corresponding to the current transmission process, channel information corresponding to the current transmission process, and frequency domain location information corresponding to the current transmission process, and the number of transmissions (how many times transmission has been performed).

In a specific embodiment, the bit sequence B2 transmitted on the second time-frequency resource region includes partial bits of the bit sequence B and the bit sequence B0 that determines the first index value Index1 and the second index value Index2. That is, a bit sequence B2 transmitted on the second time-frequency resource region includes partial bits of bit sequence B and bit sequence B0 that determines the first index value Index1 and the second index value Index2.

In a specific embodiment, as shown in FIG. 5, the bit sequence B2 transmitted on the second time-frequency resource region includes terminal identity identification information or transmitter identity identification information; or includes terminal identity identification information and at least one of the following information: cell identification information, signaling information and data information; or includes transmitter identity identification information and at least one of the following information: cell identification information, signaling information and data information. Namely, the bit sequence B2 transmitted on the second time-frequency resource region includes terminal identity identification information or transmitter identity identification information, or further includes cell identification information (optional), and signaling information (optional) and data information (optional), these bits include B0.

In this embodiment, the signaling information includes a buffer status report for the transmitter, or includes scheduling request information for the transmitter, or includes the system parameter information associated with the current transmission process. That is, the signaling information includes buffer status report (BSR) or scheduling request (SR) information for the transmitter or system parameter information T related to the current transmission.

Figure 6:
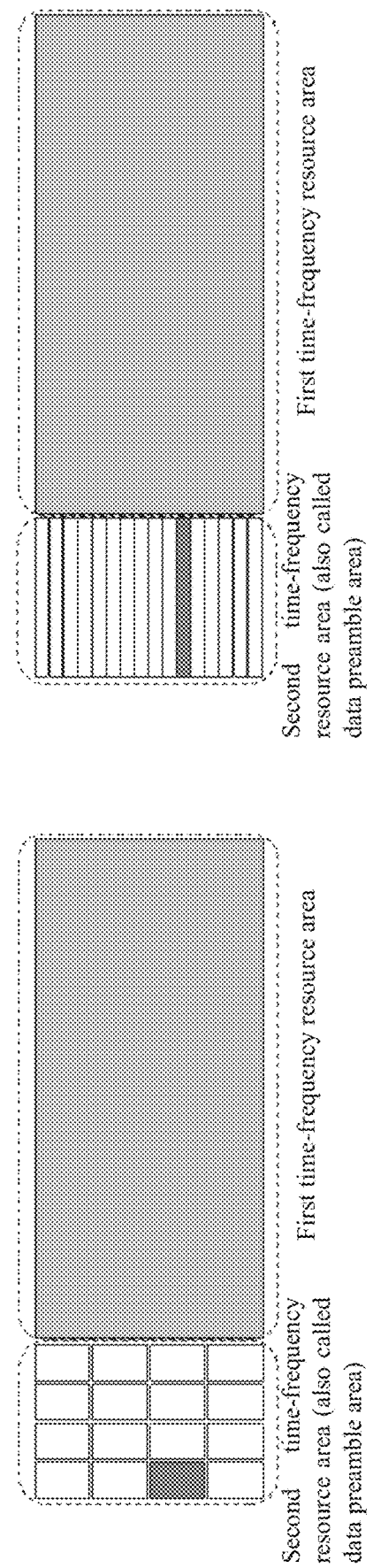
FIG. 6 is a diagram showing a structure of a second time-frequency resource area according to an embodiment of present disclosure.

In this embodiment, as shown in FIG. 6, a way to divide the second time-frequency resource region into K2 sub-resource pools includes orthogonal division; wherein, the orthogonal division includes frequency domain orthogonal division, time domain orthogonal division, code domain orthogonal division, and orthogonal division formed based on mixed use of frequency domain orthogonal division, the time domain orthogonal division and the code domain orthogonal division. That is, the way to divide the second time-frequency resource region into K2 sub-resource pools is orthogonal division; the orthogonal division includes frequency domain orthogonal division, time domain orthogonal division, code domain orthogonal division (i.e., spread by orthogonal codes or orthogonal sequences.), and orthogonal division formed based on mixed use of frequency domain orthogonal division, the time domain orthogonal division and the code domain orthogonal division. Wherein, the frequency domain division could be centralized frequency domain division and distributed frequency domain division.

In this embodiment, the first index value Index1 is determined based on W1 bits in the bit sequence B, or is determined based on W1 bits generated from an operation of bits in the bit sequence B; the second index value Index2 is determined based on W2 bits in the bit sequence B, or is determined based on W2 bits generated from an operation of bits in the bit sequence B; wherein, the W1=ceil(log 2(K1)), the W2=ceil(log 2(K2)). Here, the first time-frequency resource region has K1 sequences, and the second time-frequency resource region has K2 sub-resource pools; the first index value Index1 is required to be determined by W1=ceil(log 2(K1)) bits; the second index value Index2 is required to be determined by W2=ceil(log 2(K2)) bits. As shown in FIG. 5(b), Index1 is composed of W1 bits in the bit sequence B, or is composed of W1 bits generated from a certain operation of bits in the bit sequence B. Index2 is composed of W2 bits in the bit sequence B, or is composed of W2 bits generated from a certain operation of bits in the bit sequence B. Here, the ceil is an operation of rounding up.

In this embodiment, the number of spreading sequences is greater than or equal to the number of orthogonal pools, that is, the W1 is greater than or equal to the W2; or, the W1 bits include the W2 bits. That is, the W1 bits include the W2 bits, or the W2 bits are specific W2 bits of the W1 bits.

In this embodiment, the W1 bits are selected from the bit sequence B according to system parameter information associated with the current transmission process; the W2 bits are W2 bits of the W1 bits; the system parameter information includes at least one of the following information: a system frame number corresponding to the current transmission process, channel information corresponding to the current transmission process, and frequency domain location information corresponding to the current transmission process, and the number of transmissions. Here, the Index1 and the Index2 could be changed according to each transmission parameter to increase randomness and prevent collision after retransmission due to previous collision. The W1 bits are selected from the bit sequence B according to the system parameter T of the current transmission. The W2 bits are W2 bits of the W1 bits. The system parameter information T associated with the current transmission includes at least one of the following information: a system frame number corresponding to the current transmission process, channel information corresponding to the current transmission process, and frequency domain location information corresponding to the current transmission process, and the number of transmissions.

In this embodiment, an operation method of the bit sequence B is determined according to the system parameter information associated with the current transmission process, the W1 bits are generated based on the determined operation method; the W2 bits are W2 bits of the W1 bits; the system parameter information includes at least one of the following information: a system frame number corresponding to the current transmission process, channel information corresponding to the current transmission process, and frequency domain location information corresponding to the current transmission process, and the number of transmissions. Here, the Index1 and the Index2 could be changed according to each transmission parameter to increase randomness and prevent collision after retransmission due to previous collision; different operation methods of the bit sequence B are determined to generate the W1 bits according to the system parameter T of the current transmission. The W2 bits are W2 bits of the W1 bits. The system parameter information T associated with the current transmission includes at least one of the following information: a system frame number corresponding to the current transmission process, channel information corresponding to the current transmission process, and frequency domain location information corresponding to the current transmission process, and the number of transmissions.

In this embodiment, the system parameter information is carried in signaling information of the bit sequence B for transmission. That is, the system parameter information T associated with the current transmission could be transmitted in control signaling field Ctrl of the bit sequence B (which is a displayed transmission parameter). Certainly, in practical application, the system parameter information may not be transmitted, because it is known for the receiver.

Figure 7:
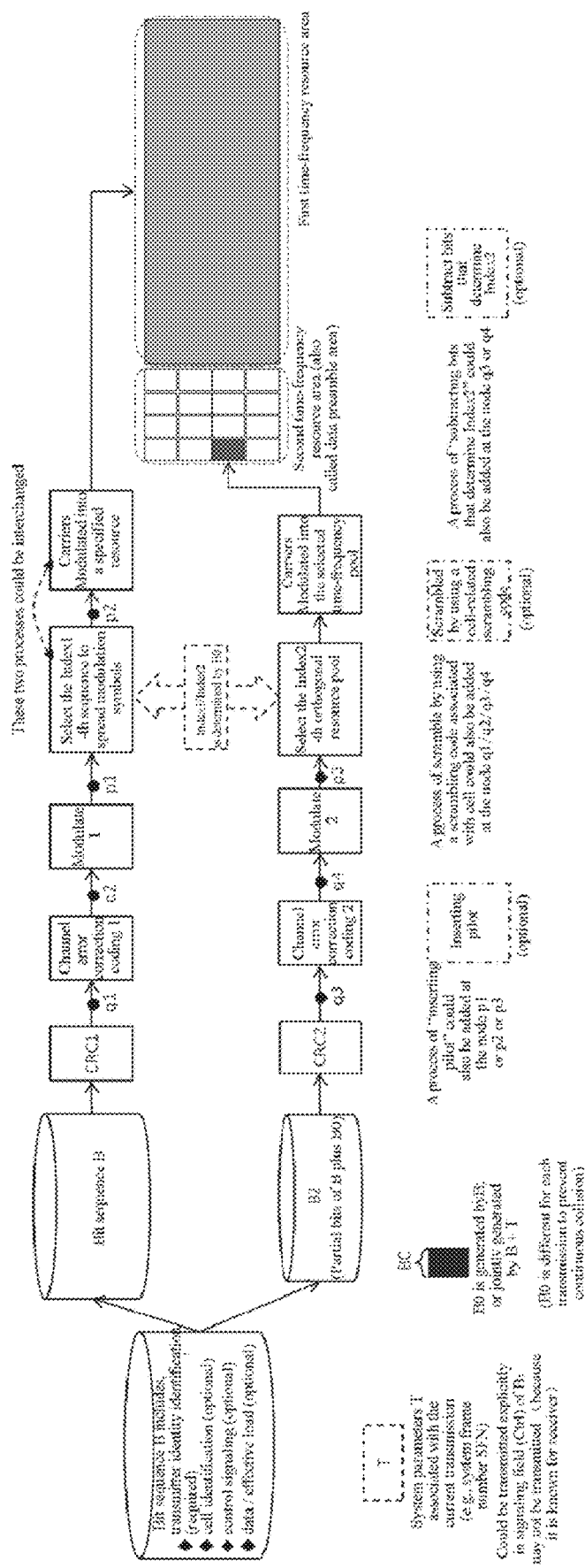
FIG. 7 is a schematic diagram illustrating a process flow for generating transmission signals based on a bit sequence B or a bit sequence B2 according to an embodiment of present disclosure.
Figure 8:
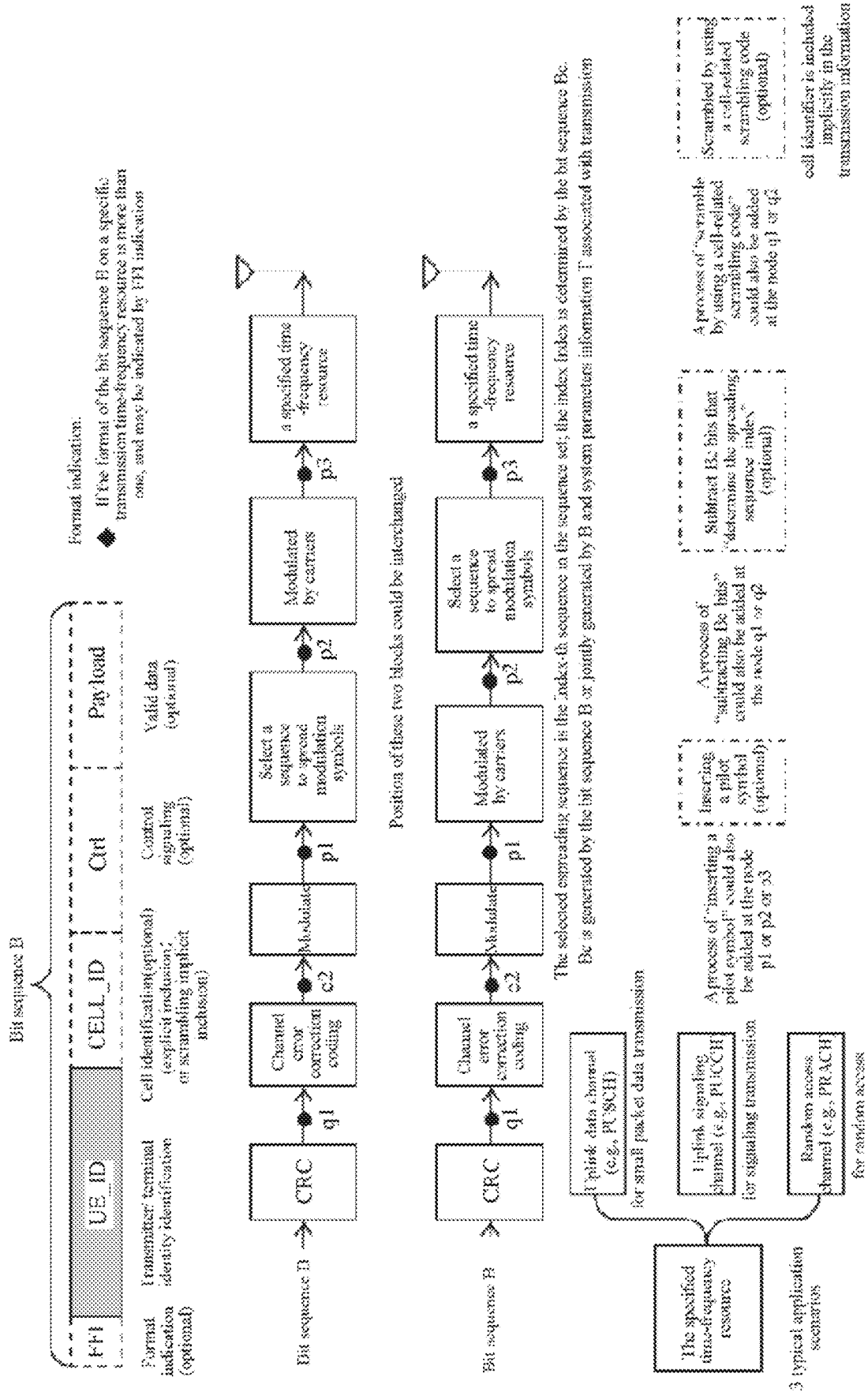
FIG. 8 is a schematic diagram illustrating a detailed process flow for generating transmission signals based on a bit sequence B according to an embodiment of present disclosure.

In this embodiment, as shown in FIG. 7 and FIG. 8, the method further includes that, the transmission signals generated based on the bit sequence B are modulated to the first time-frequency resource region for transmission by the transmitter using carrier modulation; the transmission signals generated based on the bit sequence B2 are modulated to the Index2-th sub-resource pool for transmission by the transmitter using carrier modulation;

Wherein, a process of generating the transmission signals based on the bit sequence B includes a symbol spreading process, and the symbol spreading process is performed before or after the step of carrier modulation.

In a specific embodiment, the symbol spreading process is performed prior to the step of carrier modulation; correspondingly, the modulating, by the transmitter using carrier modulation, the transmission signals generated based on the bit sequence B to the first time-frequency resource region for transmission includes that, the bit sequence B is formed into modulation symbols by cyclic redundancy check CRC coding, channel forward error correction FEC coding, and digital amplitude and phase modulation, the modulation symbols are spread by using the Index1-th sequence, and the modulation symbols are modulated by carriers to the first time-frequency resource region for transmission by using orthogonal frequency division multiplexing OFDM or single-carrier frequency division multiplexing SC-FDMA/Discrete Fourier spread single carrier orthogonal frequency division multiplexing DFT-S-OFDM carrier modulation technology;

Or, the symbol spreading process is performed after the step of the carrier modulation, correspondingly, the modulating the transmission signals generated based on the bit sequence B to the first time-frequency resource region for transmission by using carrier modulation includes:

The bit sequence B is formed into modulation symbols by cyclic redundancy check CRC coding, channel forward error correction FEC coding, and digital amplitude and phase modulation, the modulation symbols are modulated by using orthogonal frequency division multiplexing OFDM or single-carrier frequency division multiplexing SC-FDMA/Discrete Fourier spread single carrier orthogonal frequency division multiplexing DFT-S-OFDM carrier modulation technology, and the modulated modulation symbols are spread by using the Index1-th sequence and then transmitted on the first time-frequency resource region.

In another embodiment, in the step of generating the transmission signals based on the bit sequence B, after the step of forming the modulation symbols, and before the transmission signals generated based on the bit sequence B is transmitted, the method further includes: inserting a pilot symbol.

In another embodiment, in the step of generating the transmission signals based on the bit sequence B, after the step of performing the cyclic redundancy check CRC coding, and before the step of performing the channel forward error correction FEC coding, the method further includes:

scrambling the bit sequence B by using a scrambling code associated with the cell identification information;

Or, after the step of performing the channel forward error correction FEC coding, and before the step of performing the digital amplitude and phase modulation, the method further includes: scrambling the bit sequence, which is encoded by the channel forward error correction FEC coding, by using a scrambling code associated with the cell identification information.

In another embodiment, the modulating the transmission signals generated based on the bit sequence B2 to the Index2-th sub-resource pool for transmission by using carrier modulation includes:

The bit sequence B2 is formed into modulation symbols by cyclic redundancy check CRC coding, channel forward error correction FEC coding, and digital amplitude and phase modulation, the Index2-th sub-resource pool is selected, and the modulation symbols are modulated by carriers to the Index2-th sub-resource pool for transmission by using orthogonal frequency division multiplexing OFDM or single-carrier frequency division multiplexing SC-FDMA/Discrete Fourier spread single carrier orthogonal frequency division multiplexing DFT-S-OFDM carrier modulation technology.

In another embodiment, in the step of generating the transmission signals based on the bit sequence B2, after the step of forming the modulation symbols, and before the step of selecting the Index2-th sub-resource pool, the method further includes: inserting a pilot symbol.

In another embodiment, in the step of generating the transmission signals based on the bit sequence B2, after the step of performing the cyclic redundancy check CRC coding, and before the step of performing the digital amplitude and phase modulation, the method further includes:

The bit sequence B2 is scrambled by using a scrambling code associated with the cell identification information; and/or, the bits in the bit sequence B2 that determines the second index value Index2 are subtracted.

It is to be noted that, in actual applications, different options to combine to generate the transmission signals may be selected in different scenarios and different applications, which is not limited in this embodiment.

In this embodiment, the cell identification information (such as 6 bits) may be included explicitly or implicitly in the transmission information. Here, the explicit inclusion means that the cell identification information bit (Cell_ID) is placed in the bit sequence B and coded together with the bit sequence B; correspondingly, the base station detects the bit sequence B, and the Cell_ID could be directly extracted. The implicit inclusion means that a scrambling code is generated from the Cell_ID, and bits encoded by the CRC are scrambled with the scrambling code. In this way, the base station is required to traverse all the scrambling codes, which scrambling code could be descrambled to pass the CRC could indicate that the transmitter uses the scrambling code, and then the Cell_ID of the transmitter is obtained.

Figure 9:
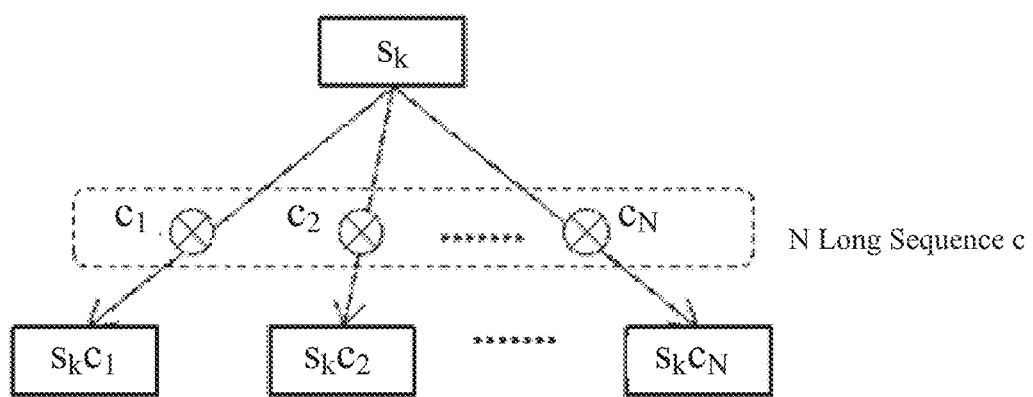
FIG. 9 is a schematic diagram illustrating a symbol spreading process according to an embodiment of present disclosure.

The symbol spreading principle is used to spread the transmission signals in the method of this embodiment. The symbol spreading process described in the embodiment of the present disclosure is further described in detail below; here, the symbols of different users are spread by the spreading sequence that have low cross-correlation, and even if they are aliased on the same time-frequency resource, they could be separated; if the number of low cross-correlation sequences is large, the probability of collision (multiple users select the same sequence) could be controlled to a lower level even if different users select the sequence randomly, therefore, the optimized design of the sequence spreading technology can increase the number of simultaneous access links. Specifically, the sequence spreading process is as follows: each access terminal firstly spreads modulated data symbols with a certain length of a spreading sequence (such as a spreading sequence of length N, here, the spreading sequence of length N means that the spreading sequence consists of N symbols or N elements, wherein N symbols/N elements could be L digital symbols), the symbol spreading process means that each modulated data symbol is multiplied by each symbol in the spreading sequence to finally form a symbol sequence having the same length as the spreading sequence used. As shown in FIG. 9, it is assumed that the data symbol is $S_k$, the $S_K$ could be a constellation point symbol modulated by BPSK/QAM, or symbol modulated by an OFDM carrier, and it is assumed that the spreading sequence is a spreading sequence C={$c_1$, $c_2$, ... $c_N$} of length N, at this time, the symbol spreading process means that the $S_k$ is multiplied by each element in the spreading sequence C to finally obtain the spreading sequence {$S_k c_1$, $S_k c_2$, ... $S_k c_N$}. A specific formula can be expressed as:

$$S_k \times \begin{bmatrix} c_1 \\ \vdots \\ c_N \end{bmatrix} = \begin{bmatrix} s_k c_1 \\ \vdots \\ s_k c_N \end{bmatrix}$$

Specifically, the spreading sequence described in this embodiment is usually taken from a spreading sequence set, the index value Index of the used spreading sequence is determined by the bits in the bit sequence B, or determined by the bits in bit sequence B plus additional system parameter information.

For example, in a specific embodiment, the spreading sequence is the Index-th sequence in a sequence set containing K1 spreading sequences, the sequence set containing K1 spreading sequences is generated by sequence point-wise multiplication based on the first sequence set and the second sequence set; or by replacing the non-zero elements of each sequence in the second sequence set with sequence elements generated by sequence point-wise multiplication of a sequence consisting of non-zero elements in the each sequence and a sequence in the first sequence set; the Index is determined by the Bc bits generated by the bit sequence B corresponding to the transmission information (the Bc bits may be directly taken from the bit sequence B, or may be generated by the proportional characteristic B through a certain operation); point-wise multiplication operation of two sequence is the multiplication of elements in the same position of two sequences.

Here, the first sequence set is obtained through multiple extensions of a reference sequence set which comprise multiplying elements of the same position in each sequence of the reference sequence set by 1 or −1, or by j or −j, or by 1,−1, j, or −j, or by exp(j×M×π); wherein j=sqrt(−1), the j is an imaginary unit and the M is a real sequence.

In a specific embodiment, a value of a sequence element in the sequence set containing the K1 spreading sequences is derived by at least one of the following sets:
{1,1i,−1,−1i};{1,−1};{1i,−1i};{1};{−1};{1i};{−1i};{1+1i,−1+1i,−1−1i,1−1i};{0};{1,1i,−1,−1i,0};{1+1i,−1+1i,−1−i,−1i,0};{1,1i,−1,−1i,2,2i,−2,−2i,0}; wherein, the i is an imaginary unit, and the i=sqrt(−1).

In another specific embodiment, the first sequence set includes at least one of a following sequence set and a sequence set formed by processing the following sequence set; wherein, the process of the following sequence sets includes:

Each sequence in the following sequence set or the X-th sequence element of each sequence is multiplied by 1, 1i, −1, or −1i, or by A-th power of 1i;

Or, each sequence in the following sequence set or the X-th sequence element of each sequence is processed through phase adjustment or rotation of W×π, or through multiplication by exp(j×W×π), the j is an imaginary unit, and the j=sqrt(−1);

Or, each sequence in the following sequence set or the X-th sequence element of each sequence is multiplied by a specified value, or by specified values respectively;

Wherein, the X is an integer greater than or equal to 1 and less than or equal to the length of the sequence, the A is an integer, and the W is a real number;

Wherein,

A first specified sequence set includes at least one of the following sequence sets:

Sequence set 1:
The sequence set 1 includes 4 sequences of length 4, wherein,
The first sequence is [1,1,1,1],
The second sequence is [1,1,1i,−1i],
The third sequence is [1,1i,1,−1i],
The fourth sequence is [1,1i,1i,−1];

Sequence set 2:
The sequence set 2 includes 4 sequences of length 4, wherein,
The first sequence is [1,1,1,−1],
The second sequence is [1,1,1i,1i],
The third sequence is [1,1i,1,1i],
The fourth sequence is [1,1i,1i,1];

Sequence set 3:
The sequence set 3 includes 4 sequences of length 4, wherein,
The first sequence is [1,1,1,1i],
The second sequence is [1,1,1i,1],
The third sequence is [1,1i,1,1],
The fourth sequence is [1,1i,1i,−1i];

Sequence set 4:
The sequence set 4 includes 4 sequences of length 4, wherein,
The first sequence is [1,1,1,−1i],
The second sequence is [1,1,1i,−1],
The third sequence is [1,1i,1,−1],
The fourth sequence is [1,1i,1i,1i];

Sequence set 5:
The sequence set 5 includes one sequence of length 2, wherein,
The first sequence is [1,1];

Sequence set 6:
The sequence set 6 includes one sequence of length 2, wherein,
The first sequence is [1,−1];

Sequence set 7:
The sequence set 7 includes one sequence of length 2, wherein,
The first sequence is [1,1i];

Sequence set 8:
The sequence set 8 includes one sequence of length 2, wherein,
The first sequence is [1,−1i];

Sequence set 9:
The sequence set 9 includes 4 sequences of length 1, wherein,

The first sequence is [1],
The second sequence is [1i],
The third sequence is [−1],
The fourth sequence is [−1i];
Sequence set 10:
The sequence set 10 includes 4 sequences of length 1, wherein,
The first sequence is [1+1i],
The second sequence is [−1+1i],
The third sequence is [−1−1i],
The fourth sequence is [1−1i];
Sequence set 11:
The sequence set 11 includes 2 sequences of length 1, wherein,
The first sequence is [1],
The second sequence is [−1];
Sequence set 12:
The sequence set 12 includes 2 sequences of length 1, wherein,
The first sequence is [1i],
The second sequence is [−1i];
Sequence set 13:
The sequence set 13 includes one sequence of length 1, wherein,
The first sequence is [1];
Sequence set 14:
The sequence set 14 includes one sequence of length 1, wherein,
The first sequence is [−1];
Sequence set 15:
The sequence set 15 includes one sequence of length 1, wherein,
The first sequence is [1i];
Sequence set 16:
The sequence set 16 includes one sequence of length 1, wherein,
The first sequence is [−1i];
Sequence set 17:
The sequence set 17 includes 4 sequences of length 3, wherein,
The first sequence is [1,1,1],
The second sequence is [1,−1,−1],
The third sequence is [−1,1,−1],
The fourth sequence is [−1,1,1];
Wherein, the i is an imaginary unit, and the i=sqrt(−1).

In a specific embodiment, the second sequence set includes at least one of the following:
Hadamard sequence set; a Walsh sequence set; a Discrete Fourier Transform sequence set; a sequence set containing a specified number or a specified proportion of 0 elements; and an unit matrix sequence set;
The length of each sequence in the second sequence set is the same as the length of each sequence in the first sequence set.

In another specific embodiment, the second sequence set includes at least one of a following sequence set and a sequence set formed by processing the following sequence set; wherein, the process of the following sequence set includes:
Each sequence in the following sequence set or the X-th sequence element of each sequence is multiplied by 1, 1i, −1, or −1i, or by A-th power of 1i;
Or, each sequence in the following sequence set or the X-th sequence element of each sequence is processed through phase adjustment or rotation of W×π, or through multiplication by exp(j×W×π), the j is an imaginary unit, and the j=sqrt(−1);

Or, each sequence in the following sequence set or the X-th sequence element of each sequence is multiplied by a specified value, or by specified values respectively;
Wherein, the X is an integer greater than or equal to 1 and less than or equal to the length of the sequence, the A is an integer, and the W is a real number;
Wherein,
Sequence set 1:
The sequence set 1 includes 4 sequences of length 4, wherein,
The first sequence is [1,1,1,1],
The second sequence is [1,1,−1,−1],
The third sequence is [1,−1,1,−1],
The fourth sequence is [1,−1,−1,1];
Sequence set 2:
The sequence set 2 includes 4 sequences of length 4, wherein,
The first sequence is [1,1,1,1],
The second sequence is [1,1i,−1,−1i],
The third sequence is [1,−1,1,−1],
The fourth sequence is [1,−1i,−1,1i];
Sequence set 3:
The sequence set 3 includes 2 sequences of length 2, wherein,
The first sequence is [1,1],
The second sequence is [1,−1];
Sequence set 4:
The sequence set 4 includes one sequence of length 1, wherein,
The first sequence is [1];
Sequence set 5:
The sequence set 5 includes 6 sequences of length 4, wherein,
The first sequence is [1,1,0,0],
The second sequence is [1,0,1,0],
The third sequence is [1,0,0,1],
The fourth sequence is [0,1,1,0],
The fifth sequence is [0,1,0,1],
The sixth sequence is [0,0,1,1];
Sequence set 6:
The sequence set 6 includes 4 sequences of length 6, wherein,
The first sequence is [1,1,1,0,0,0],
The second sequence is [1,0,0,1,1,0],
The third sequence is [0,1,0,0,1,1],
The fourth sequence is [0,0,1,1,0,1];
Sequence set 7:
The sequence set 7 includes 4 sequences of length 6, wherein,
The first sequence is [1,0,1,0,1,0],
The second sequence is [1,0,0,1,0,1],
The third sequence is [0,1,1,0,0,1],
The fourth sequence is [0,1,0,1,1,0];
Sequence set 8:
The sequence set 8 includes 4 sequences of length 4, wherein,
The first sequence is [1,0,0,0],
The second sequence is [0,1,0,0],
The third sequence is [0,0,1,0],
The fourth sequence is [0,0,0,1];
Sequence set 9:
The sequence set 9 includes 6 sequences of length 6, wherein,
The first sequence is [1,1,1,1,1,1],
The second sequence is [1,1,1i,−1,−1,−1i],
The third sequence is [1,1i,−1i,1i,−1i,−1],
The fourth sequence is [1,−1,1,−1i,−1,1i], The fifth sequence is [1,−1,−1,1,1i,−1i],
The sixth sequence is [1,−1i,−1,−1,1,1i];
Wherein, the i is an imaginary unit, and the i=sqrt(−1).

In a specific embodiment, the sequence set containing the K1 spreading sequences includes at least one of a following sequence set and a sequence set formed by processing the following sequence set; wherein, The process of the following sequence sets includes:

Each sequence in the following sequence set or the X-th sequence element of each sequence is multiplied by 1, 1i, −1, or −1i, or by A-th power of 1i;

Or, the each sequence in the following sequence set or the X-th sequence element of each sequence is processed through phase adjustment or rotation of W×π, or through multiplication by exp(j×W×π), the j is an imaginary unit, and the j=sqrt(−1);

Or, each sequence in the following sequence set or the X-th sequence element of each sequence is multiplied by a specified value, or by specified values respectively;

Wherein, the X is an integer greater than or equal to 1 and less than or equal to the length of the sequence, the A is an integer, and the W is a real number;

Wherein,

Sequence set 1:

The sequence set 1 includes 16 sequences of length 4, wherein,

The first sequence is [1,1,1,1],
The second sequence is [1,1,−1,−1],
The third sequence is [1,−1,1,−1],
The fourth sequence is [1,−1,−1,1],
The fifth sequence is [1,1,1i,−1i],
The sixth sequence is [1,1,−1i,1i],
The seventh sequence is [1,−1,1i,1i],
The eighth sequence is [1,−1,−1i,−1i],
The ninth sequence is [1,1i,1,−1i],
The tenth sequence is [1,1i,−1,1i],
The eleventh sequence is [1,−1i,1,1i],
The twelfth sequence is [1,−1i,−1,−1i],
The thirteenth sequence is [1,1i, 1i,−1],
The fourteenth sequence is [1,1i,−1i,1],
The fifteenth sequence is [1,−1i, 1i,1],
The sixteenth sequence is [1,−1i,−1i,−1];

Sequence set 2:

The sequence set 2 includes 16 sequences of length 4, wherein,

The first sequence is [1,1,1,−1],
The second sequence is [1,1,−1,1],
The third sequence is [1,−1,1,1],
The fourth sequence is [1,−1,−1,−1],
The fifth sequence is [1,1,1i,1i],
The sixth sequence is [1,1,−1i,−1i],
The seventh sequence is [1,−1,1i,−1i],
The eighth sequence is [1,−1,−1i,1i],
The ninth sequence is [1,1i,1,1i],
The tenth sequence is [1,1i,−1,−1i],
The eleventh sequence is [1,−1i,1,−1i],
The twelfth sequence is [1,−1i,−1,1i],
The thirteenth sequence is [1,1i,1i,1],
The fourteenth sequence is [1,1i,−1i,−1],
The fifteenth sequence is [1,−1i,1i,−1],
The sixteenth sequence is [1,−1i,−1i,1];

Sequence set 3:

The sequence set 3 includes 16 sequences of length 4, wherein,

The first sequence is [1,1,1,1i],
The second sequence is [1,1,−1,−1i],
The third sequence is [1,−1,1,−1i],
The fourth sequence is [1,−1,−1,1i],
The fifth sequence is [1,1,1i,1],
The sixth sequence is [1,1,−1i,−1],
The seventh sequence is [1,−1,1i,−1],
The eighth sequence is [1,−1,−1i,1],
The ninth sequence is [1,1i,1,1],
The tenth sequence is [1,1i,−1,−1],
The eleventh sequence is [1,−1i,1,−1],
The twelfth sequence is [1,−1i,−1,1],
The thirteenth sequence is [1,1i, 1i,−1i],
The fourteenth sequence is [1,1i,−1i,1i],
The fifteenth sequence is [1,−1i, 1i,1i],
The sixteenth sequence is [1,−1i,−1i,−1i];

Sequence set 4:

The sequence set 4 includes 16 sequences of length 4, wherein,

The first sequence is [1,1,1,−1i],
The second sequence is [1,1,−1,1i],
The third sequence is [1,−1,1,1i],
The fourth sequence is [1,−1,−1,−1i],
The fifth sequence is [1,1,1i,−1],
The sixth sequence is [1,1,−1i,1],
The seventh sequence is [1,−1,1i,1],
The eighth sequence is [1,−1,−1i,−1],
The ninth sequence is [1,1i,1,−1],
The tenth sequence is [1,1i,−1,1],
The eleventh sequence is [1,−1i,1,1],
The twelfth sequence is [1,−1i,−1,−1],
The thirteenth sequence is [1,1i,1i,1i],
The fourteenth sequence is [1,1i,−1i,−1i],
The fifteenth sequence is [1,−1i, 1i,−1i],
The sixteenth sequence is [1,−1i,−1i,1i];

Sequence set 5:

The sequence set 5 includes 32 sequences of length 4, wherein,

The first sequence is [1,1,1,1],
The second sequence is [1,1i,−1,−1i],
The third sequence is [1,−1,1,−1],
The fourth sequence is [1,−1i,−1,1i],
The fifth sequence is [1,1,1i,−1i],
The sixth sequence is [1,1i,−1i,−1],
The seventh sequence is [1,−1,1i,1i],
The eighth sequence is [1,−1i,−1i,1],
The ninth sequence is [1,1i,1,−1i],
The tenth sequence is [1,−1,−1,−1],
The eleventh sequence is [1,−1i,1,1i],
The twelfth sequence is [1,1,−1,1],
The thirteenth sequence is [1,1i, 1i,−1],
The fourteenth sequence is [1,−1,−1i,1i],
The fifteenth sequence is [1,−1i, 1i,1],
The sixteenth sequence is [1,1,−1i,−1i],
The seventeen sequence is [1,1,1,−1],
The eighteenth sequence is [1,1i,−1,1i],
The nineteenth sequence is [1,−1,1,1],
The twentieth sequence is [1,−1i,−1,−1i],
The twenty-first sequence is [1,1,1i,1i],
The twenty-second sequence is [1,1i,−1i,1],
The twenty-third sequence is [1,−1,1i,−1i],
The twenty-fourth sequence is [1,−1i,−1i,−1],
The twenty-fifth sequence is [1,1i,1,1i],
The twenty-sixth sequence is [1,−1,−1,1],
The twenty-seventh sequence is [1,−1i,1,−1i],
The twenty-eighth sequence is [1,1,−1,−1],
The twenty-ninth sequence is [1,1i,1i,1],
The thirtieth sequence is [1,−1,−1i,−1i],
The thirty-first sequence is [1,−1i,1i,−1],
The thirty-second sequence is [1,1,−1i,1i];

Sequence set 6:

The sequence set 6 includes 32 sequences of length 4, wherein,

The first sequence is [1,1,1,1i],
The second sequence is [1,1i,−1,1],
The third sequence is [1,−1,1,−1i],
The fourth sequence is [1,−1i,−1,−1],
The fifth sequence is [1,1,1i,1],
The sixth sequence is [1,1i,−1i,−1i],
The seventh sequence is [1,−1,1i,−1],
The eighth sequence is [1,−1i,−1i,1i],
The ninth sequence is [1,1i,1,1],
The tenth sequence is [1,−1,−1,−1i],
The eleventh sequence is [1,−1i,1,−1],
The twelfth sequence is [1,1,−1,i],
The thirteenth sequence is [1,1i, 1i,−1i],
The fourteenth sequence is [1,−1,−1i,−1],
The fifteenth sequence is [1,−1i,1i,i],
The sixteenth sequence is [1,1,−1i,1],
The seventeen sequence is [1,1,1,−1i],
The eighteenth sequence is [1,1i,−1,−1],
The nineteenth sequence is [1,−1,1,1i],
The twentieth sequence is [1,−1i,−1,1],
The twenty-first sequence is [1,1,1i,−1],
The twenty-second sequence is [1,1i,−1i,1i],
The twenty-third sequence is [1,−1,1i,1],
The twenty-fourth sequence is [1,−1i,−1i,−1i],
The twenty-fifth sequence is [1,1i,1,−1],
The twenty-sixth sequence is [1,−1,−1,1i],
The twenty-seventh sequence is [1,−1i,1,1],
The twenty-eighth sequence is [1,1,−1,−1i],
The twenty-ninth sequence is [1,1i,1i,1i],
The thirtieth sequence is [1,−1,−1i,1],
The thirty-first sequence is [1,−1i,1i,−1i],
The thirty-second sequence is [1,1,−1i,−1];

Sequence set 7:

The sequence set 7 includes 4 sequences of length 4, wherein,

The first sequence is [1,0,0,0],
The second sequence is [0,1,0,0],
The third sequence is [0,0,1,0],
The fourth sequence is [0,0,0,1];

Sequence set 8:

The sequence set 8 includes 16 sequences of length 6, wherein,

The first sequence is [1,0,1,0,1,0],
The second sequence is [−1,0,1,0,−1,0],
The third sequence is [1,0,−1,0,−1,0],
The fourth sequence is [−1,0,−1,0,1,0],
The fifth sequence is [1,0,0,1,0,1],
The sixth sequence is [−1,0,0,1,0,−1],
The seventh sequence is [1,0,0,−1,0,−1],
The eighth sequence is [−1,0,0,−1,0,1],
The ninth sequence is [0,1,1,0,0,1],
The tenth sequence is [0,−1,1,0,0,−1],
The eleventh sequence is [0,1,−1,0,0,−1],
The twelfth sequence is [0,−1,−1,0,0,1],
The thirteenth sequence is [0,1,0,1,1,0],
The fourteenth sequence is [0,−1,0,1,−1,0],
The fifteenth sequence is [0,1,0,−1,−1,0],
The sixteenth sequence is [0,−1,0,−1,1,0];

Sequence set 9:

The sequence set 9 includes 16 sequences of length 6, wherein,

The first sequence is [1,1,1,0,0,0],
The second sequence is [−1,1,−1,0,0,0],
The third sequence is [1,−1,−1,0,0,0],
The fourth sequence is [−1,−1,1,0,0,0],
The fifth sequence is [0,0,1,1,1,0],
The sixth sequence is [0,0,−1,−1,1,0],
The seventh sequence is [0,0,−1,1,−1,0],
The eighth sequence is [0,0,1,−1,−1,0],
The ninth sequence is [1,0,0,0,1,1],
The tenth sequence is [−1,0,0,0,1,−1],
The eleventh sequence is [1,0,0,0,−1,−1],
The twelfth sequence is [−1,0,0,0,−1,1],
The thirteenth sequence is [0,1,0,1,0,1],
The fourteenth sequence is [0,1,0,−1,0,−1],
The fifteenth sequence is [0,−1,0,1,0,−1],
The sixteenth sequence is [0,−1,0,−1,0,1];

Sequence set 10:

The sequence set 10 includes 16 sequences of length 6, wherein,

The first sequence is [1,1,1,1,1,1],
The second sequence is [1,1,1,1,−1,−1],
The third sequence is [1,1,1,−1,1,−1],
The fourth sequence is [1,1,1,−1,−1,1],
The fifth sequence is [1,1,−1,1,1,−1],
The sixth sequence is [1,1,−1,1,−1,1],
The seventh sequence is [1,1,−1,−1,1,1],
The eighth sequence is [1,1,−1,−1,−1,−1],
The ninth sequence is [1,−1,1,1,1,−1],
The tenth sequence is [1,−1,1,1,−1,1],
The eleventh sequence is [1,−1,1,−1,1,1],
The twelfth sequence is [1,−1,1,−1,−1,−1],
The thirteenth sequence is [1,−1,−1,1,1,1],
The fourteenth sequence is [1,−1,−1,1,−1,−1],
The fifteenth sequence is [1,−1,−1,−1,1,−1],
The sixteenth sequence is [1,−1,−1,−1,−1,1];

Sequence set 11:

The sequence set 11 includes 32 sequences of length 4, wherein,

The first sequence is [1+0i,1+0i,1+0i,1+0i],
The second sequence is [1+0i,0+1i,−1+0i,−0−1i],
The third sequence is [1+0i,−1+0i,1+0i,−1+0i],
The fourth sequence is [1+0i,−0−1i,−1+0i,0+1i],
The fifth sequence is [0+2i,−0−1i,0+2i,0+1i],
The sixth sequence is [0+2i,1+0i,−0−2i,1+0i],
The seventh sequence is [0+2i,0+1i,0+2i,−0−1i],
The eighth sequence is [0+2i,−1+0i,−0−2i,−1+0i],
The ninth sequence is [0+2i,−0−1i,−1+0i,2+0i],
The tenth sequence is [0+2i,1+0i,1+0i−0−2i],
The eleventh sequence is [0+2i,0+1i,−1+0i,−2+0i],
The twelfth sequence is [0+2i,−1+0i,1+0i,0+2i],
The thirteenth sequence is [0+2i,−0−1i,0+0i,−1+0i],
The fourteenth sequence is [0+2i,1+0i,0+0i,0+1i],
The fifteenth sequence is [0+2i,0+1i,0+0i,1+0i],
The sixteenth sequence is [0+2i,−1+0i,0+0i,−0−1i],
The seventeen sequence is [−1+0i,−0−1i,−0−2i,−2+0i],
The eighteenth sequence is [−1+0i,1+0i,0+2i,0+2i],
The nineteenth sequence is [−1+0i,0+1i,−0-2i,2+0i],
The twentieth sequence is [−1+0i,−1+0i,0+2i,−0−2i],
The twenty-first sequence is [−1+0i,−2+0i,0+2i,0+1i],
The twenty-second sequence is [−1+0i,−0−2i,−0−2i,1+0i],
The twenty-third sequence is [−1+0i,2+0i,0+2i,−0−1i],
The twenty-fourth sequence is [−1+0i,0+2i,−0−2i,−1+0i],
The twenty-fifth sequence is [−1+0i,−2+0i,1+0i,−2+0i],
The twenty-sixth sequence is [−1+0i,−0−2i,−1+0i,0+2i],
The twenty-seventh sequence is [−1+0i,2+0i,1+0i,2+0i],
The twenty-eighth sequence is [−1+0i,0+2i,−1+0i,−0−2i],
The twenty-ninth sequence is [−1+0i,−2+0i,−0−1i,0+0i],
The thirtieth sequence is [−1+0i,−0−2i,0+1i,0+0i],
The thirty-first sequence is [−1+0i,2+0i,−0−1i,0+0i],
The thirty-second sequence is [−1+0i,0+2i,0+1i,0+0i];

Wherein, the i is an imaginary unit, and the i=sqrt(−1).

Figure 10:
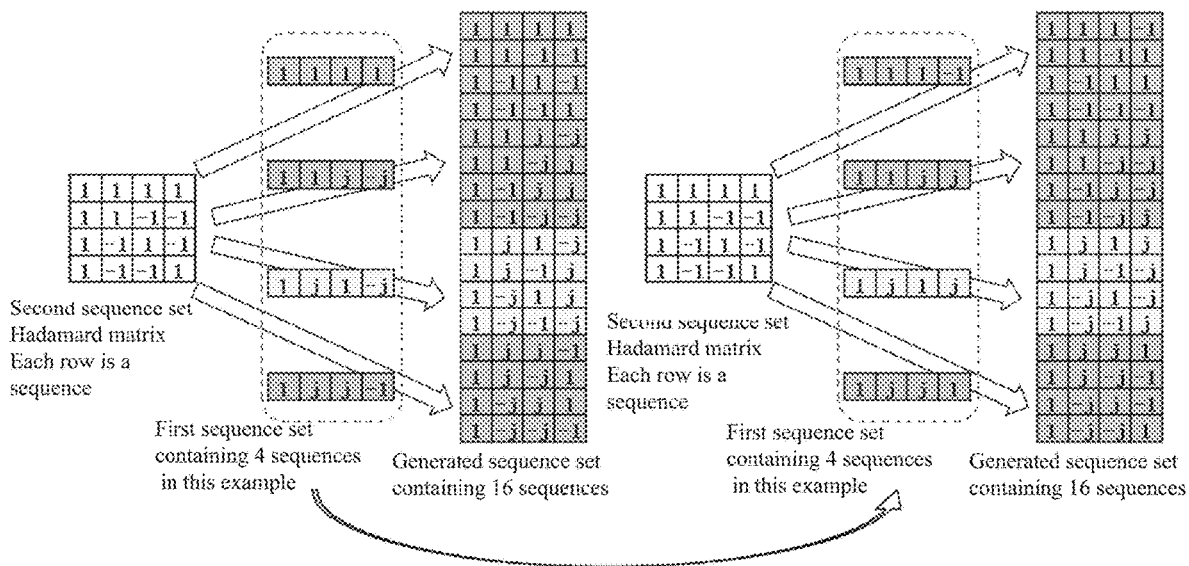
FIG. 10 to FIG. 14 are schematic diagrams for generating a sequence set containing K1 spreading sequences based on a first sequence set and a second sequence set according to an embodiment of present disclosure.
Figure 11:
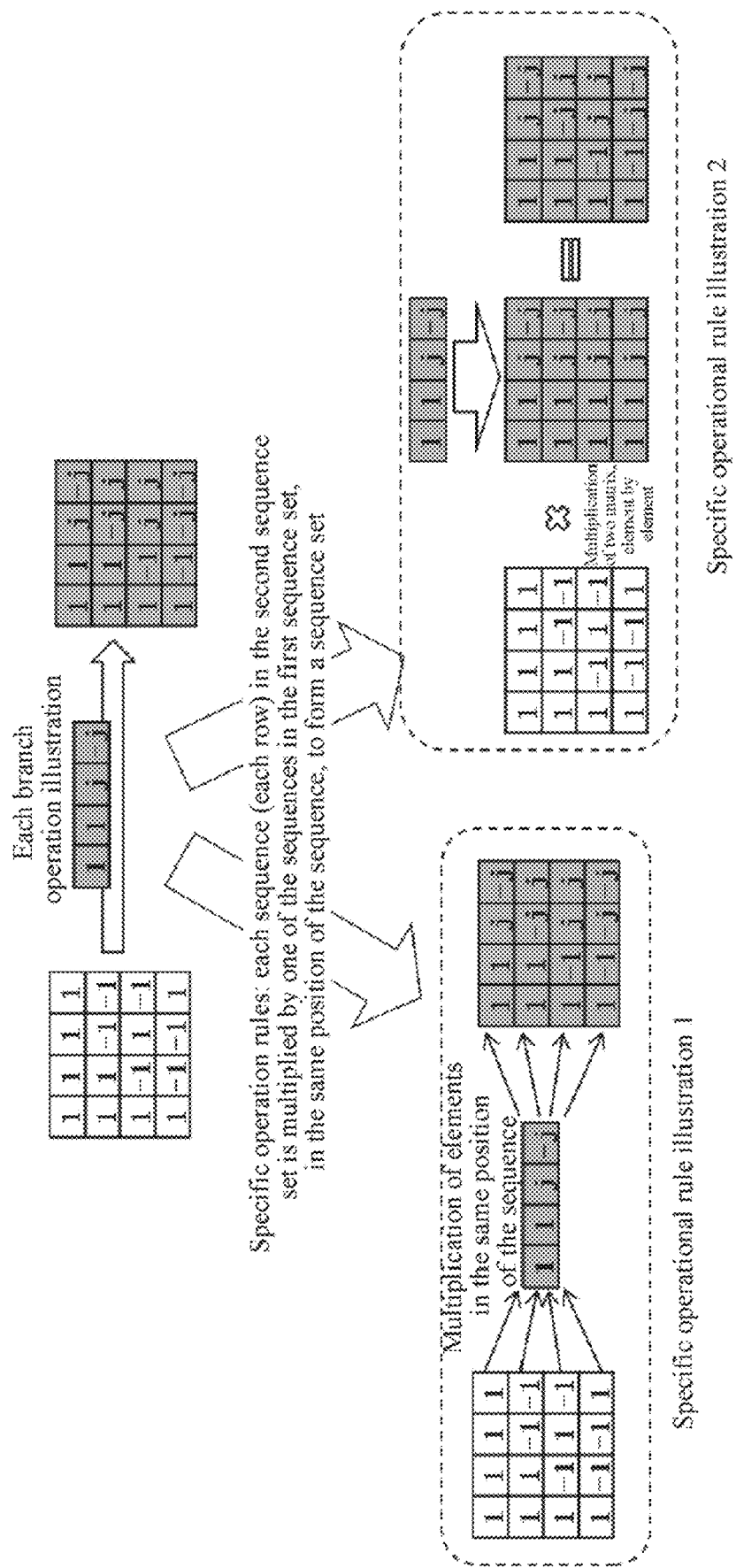

Here, the second sequence set is taken as an example of a 4×4 Hadamard matrix, wherein, each row of the Hadamard matrix is a sequence, the first sequence set is also four sequences and length of each sequence is 4 (i.e., each sequence include 4 elements), the steps of obtaining the sequence set containing the K1 spreading sequences in this embodiment are described in detail. As shown in FIG. 10 and FIG. 11, the sequence set containing the K1 spreading sequence is obtained by multiplication of elements in the same position of each sequence of the first sequence set and the second sequence set according to the symbol spreading method shown in FIG. 9, that is, a 4×4 spreading sequence set is obtained. Here, in practical application, the first sequence set could be specifically any sequence set, such as the first sequence set shown on the left side in FIG. 10, or the first sequence set shown on the left side in FIG. 10.

Figure 12:
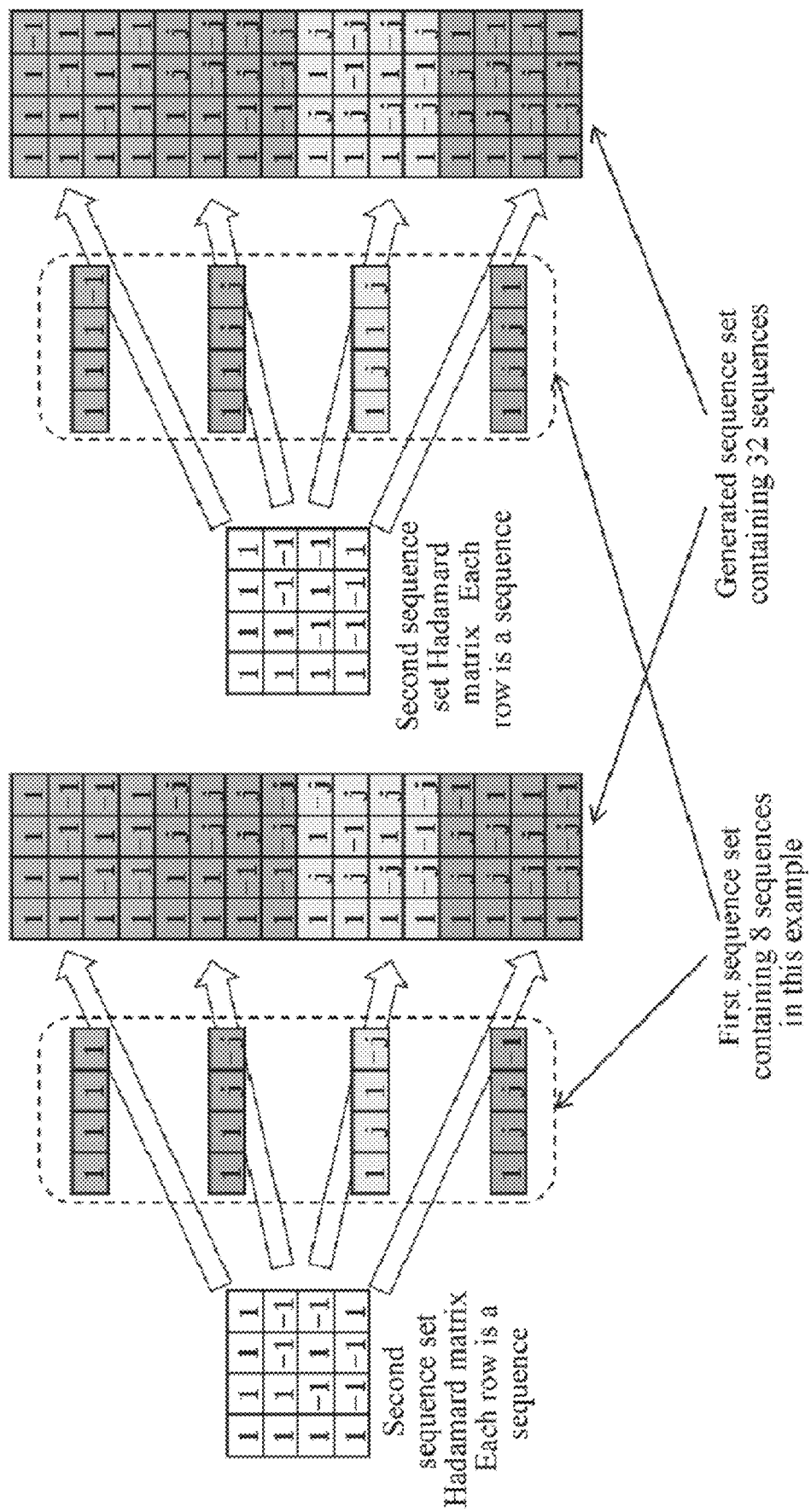
Figure 13:
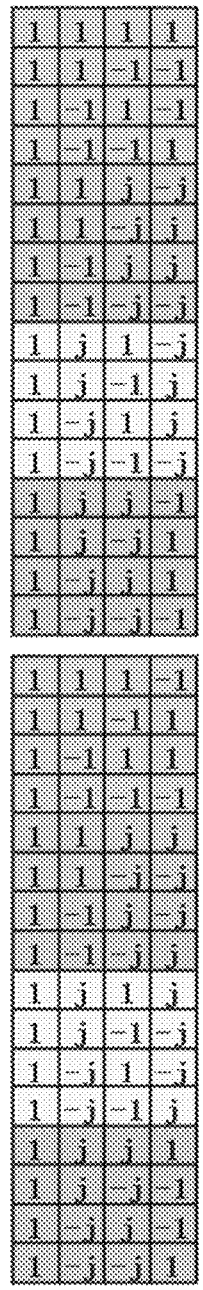

For another example, as shown in FIG. 12, the sequence set containing K1 spreading sequences may be generated from a 4×4 Hadamard matrix and the first sequence set having 8 sequences, that is, a 4×8 spreading sequence set as shown in FIG. 13 is obtained. Certainly, in practical application, 8 sequences of the first sequence set could be derived by 4 reference sequences, for example, obtained by multiplying elements in the same position of the four reference sequences by 1 or −1, or j or −j.

Figure 14:
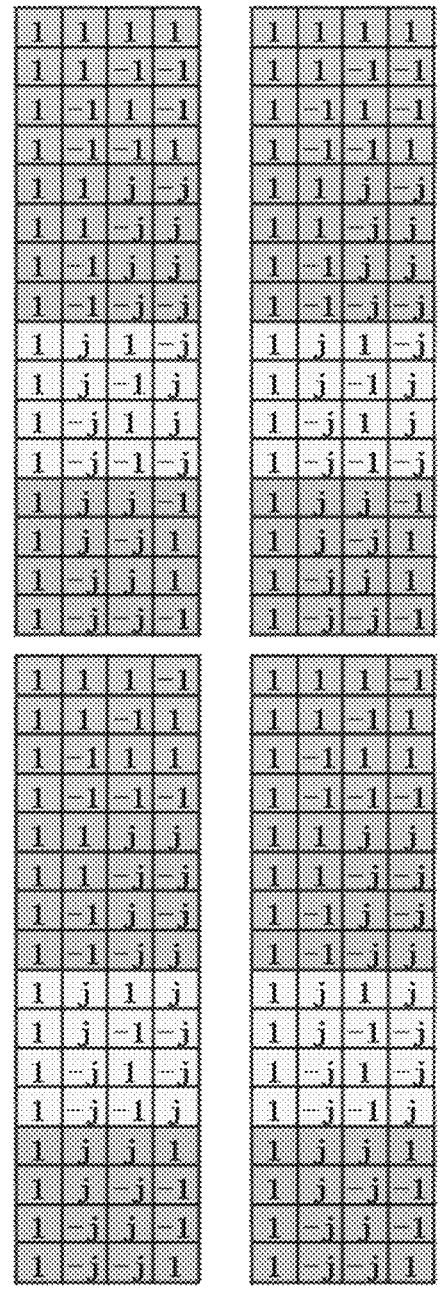

For another example, the sequence set containing K1 spreading sequences may be generated from a 4×4 Hadamard matrix and the first sequence set having 16 sequences, that is, a 4×16 spreading sequence set as shown in FIG. 14 is obtained. Certainly, in practical application, 16 sequences of the first sequence set could be derived by 4 reference sequences, for example, obtained by multiplying elements in the same position of the four reference sequences by 1 or −1, or j or −j.

Here, the process of obtaining the first sequence set based on the reference sequence is shown in the following table, the following four sets could be derived by the reference sequence, a set of sequence is obtained by multiplying the last column of the reference sequence by 1, the obtained set of sequence is the reference sequence, further, the second set of sequence is generated by multiplying the last column of the first set by −1, the third set of sequence is generated by multiplying the last column of the first set by j, the fourth set of sequence is generated by multiplying the last column of the first set by −j, thus, four sets of sequences are derived based on the reference sequence, that is, the first sequence set is obtained.

receives transmission signals transmitted by at least one of transmitters, and extracts a bit sequence B based on the transmission signals of each of the transmitters; feedback information for each of the transmitters is determined based on reconstructed signals of the bit sequence B corresponding to each of the transmitters, and the feedback information for each of the transmitters is transmitted;

Here, the feedback information includes at least terminal identity identification information, uplink synchronization alignment timing advance TA information, and a temporary identifier allocated to a cell where a terminal locates after contention resolution; or, at least includes terminal identity identification information, uplink synchronization alignment timing advance TA information, a temporary identifier allocated to a cell where a terminal locates after contention resolution, and uplink grant assigned for subsequent data of the transmitter; or, at least includes terminal identity identification information and an acknowledgement ACK/negative acknowledgement NACK; or, at least includes terminal identity identification information and an acknowledgement ACK/negative acknowledgement NACK, a temporary identifier allocated to a cell where a terminal locates after contention resolution, and uplink grant assigned for subsequent data of the transmitter.

In a specific embodiment, the temporary identifier is generated based on bits directly indicated by the receiver; or is partial bits of bits in the terminal identity identification information indicated by signaling bits; or is bits generated based on the terminal identity identification information indicated by the signaling bit.

In another specific embodiment, the transmitting the feedback information for each of the transmitters includes:

The feedback information for each of the transmitters is transmitted directly through a physical downlink control channel PDCCH; or, the feedback information for each of the transmitters is transmitted through a physical downlink shared data channel PDSCH indicated by a physical downlink control channel PDCCH.

For example, a base station receives signals on the first time-frequency resource region and the second time-frequency resource region through multi-user data detection, extracts the bit sequence B of each access user, and extracts uplink synchronization alignment TA information of the user through the reconstructed signals of the bit sequence B, and then feedbacks the corresponding feedback information to each user for the bit sequence B of each access user, wherein the feedback information includes:

| Reference Sequence | | | | Derived Sequence- 1 | | | | Derived Sequence -2 | | | | Derived Sequence -3 | | | |
|---|---|---|---|---|---|---|---|---|---|---|---|---|---|---|---|
| 1 | 1 | 1 | 1 | 1 | 1 | 1 | −1 | 1 | 1 | 1 | j | 1 | 1 | 1 | −j |
| 1 | 1 | j | −j | 1 | 1 | j | j | 1 | 1 | j | 1 | 1 | 1 | j | −1 |
| 1 | j | 1 | −j | 1 | j | 1 | j | 1 | j | 1 | 1 | 1 | j | 1 | −1 |
| 1 | j | j | −1 | 1 | j | j | 1 | 1 | j | j | −j | 1 | j | j | j |

The embodiment of the present disclosure provides a first computer storage medium, the first computer storage medium stores a computer program and a spreading sequence set, the computer program is configured to perform the foregoing data transmission method applied to a transmitter.

The Second Embodiment

This embodiment provides a data transmission method, which is applied to a receiver side; Specifically, the receiver The bit sequence B is used for random access process or for data transmission process of UE in non-connected state (e.g. a scheduling request); further, the bit sequence B includes: UE_ID, uplink synchronization alignment (or uplink synchronization advance) TA information, and a temporary identifier allocated to the local cell where the UE locates after contention resolution, or further includes Grant-for-Data information (scheduling information is made based on BSR information in Ctrl) (optional).

Here, the temporary identifier allocated to the local cell where the UE locates after contention resolution may be generated by the following ways, specifically, In the first way, specific bits are selected as a C-RNTI directly;

In the second way, partial bits of small signaling bit indication UE_ID are used as a C-RNTI;

In the third way, a C-RNTI is generated through performing a certain operation on small signaling bit indication UE_ID;

Wherein the second way and the third way are more efficient, but the mechanism is more complicated.

In practical application, for free-scheduling based on small packet data, namely, for data transmission process of UE in the non-connected state, the bit sequence B could specifically include:

UE_ID and Acknowledgement (ACK)/Negative Acknowledgement (NACK).

Here, the feedback information may be specifically fed back to the UE through the physical downlink control channel (PDCCH) directly or through a physical downlink shared data channel PDSCH indicated by the PDCCH.

In one specific embodiment, the PDCCH may be scrambled by a specific RNTI; wherein, the RNTI is a preset identifier, or is a partial identifier taken from the terminal identity identification information, specifically, For example, all users are fed back a common feedback package at one-time, and this feedback package includes feedback from all users who access currently. The base station use a PDSCH, that is indicated by a PDCCH scrambled by a preset RNTI, to transmit such a common feedback packet, such as for feedback of random access, the base station use the PDSCH, that is indicated by the PDCCH scrambled by the preset RNTI, to feedback all users who access currently, after each terminal demodulates the common feedback packet, each terminal finds its own information by comparing the UE_ID.

Separate feedback of each UE is mainly embodied in a fact that N1 bits used for scrambling the PDCCH to feedback of each UE are taken from its UE_ID, certainly, there are many ways to prevent the same scrambling of different terminals.

For bit sequence selected from the UE_ID directly, there could be D kinds of methods in UE_ID, the base station determines that which N1 bits of each terminal are taken from which N1 of its UE_ID according to the UE_ID of all users, this could prevent a situation that the UE_ID of different terminals will be identical when there is one fixed method.

The N1 bits are generated through performing a variety of certain operations on bits of the UE_ID. The base station determines a method for generating the N1 bits of each terminal according to the UE_ID of all users; this could prevent a situation that the scrambling bits of different terminals will be identical when there is one fixed generation method.

In this way, a problem of the same scrambling of different terminals could be effectively solved, but the cost is that a number of cases are required to detect blindly when the terminal detects the PDCCH blindly, and the complexity is high.

A sixth aspect of an embodiment of the present disclosure provides a second computer storage medium, the second computer storage medium stores a computer program, the computer program is configured to perform the foregoing data transmission method applied to a receiver.

The Third Embodiment

Figure 15:
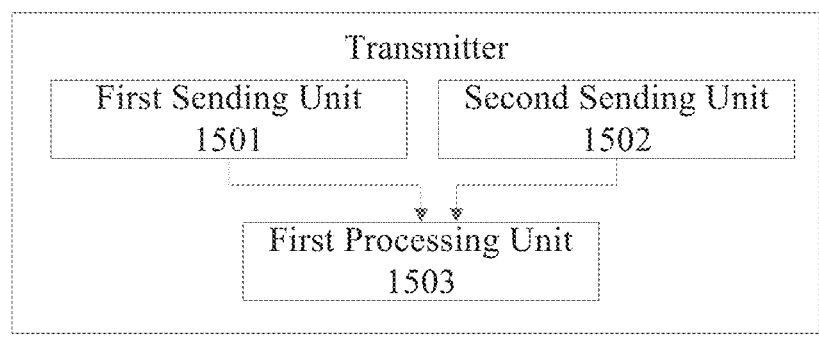
FIG. 15 is the structural sketch of the composition of a transmitter of present disclosure.

This embodiment provides a transmitter. As shown in FIG. 15, the transmitter includes a first sending unit 1501 and a second sending unit 1502.

The first sending unit 1501 is configured to transmit transmission signals, that are generated from a bit sequence B using at least a symbol spreading technology, on a first time-frequency resource region; wherein, a spreading sequence used by the symbol spreading technology is an Index1-th sequence in a sequence set containing K1 spreading sequences, the Index1-th represents a first index value.

The second sending unit 1502 is configured to use partial bits of the bit sequence B and a bit sequence B0 as a bit sequence B2, and transmits transmission signals generated based on the bit sequence B2 on an Index2-th sub-resource pool in a second time-frequency resource region containing K2 sub-resource pools. The Index2-th represents a second index value; wherein, The first index value Index1 and the second index value Index2 are both determined by the bit sequence B0; the bit sequence B0 is determined according to the bit sequence B, or is determined jointly according to the bit sequence B and system parameter information associated with the current transmission process.

In one embodiment, the bit sequence B transmitted on the first time-frequency resource region includes terminal identity identification information or transmitter identity identification information; or includes terminal identity identification information and at least one of the following information: cell identification information, signaling information and data information; or includes transmitter identity identification information and at least one of the following information: cell identification information, signaling information and data information.

In one embodiment, the system parameter information includes at least one of the following information: a system frame number corresponding to the current transmission process, channel information corresponding to the current transmission process, and frequency domain location information corresponding to the current transmission process, and the number of transmissions.

In one embodiment, the bit sequence B2 transmitted on the second time-frequency resource region includes partial bits of the bit sequence B and the bit sequence B0 that determines the first index value Index1 and the second index value Index2.

In one embodiment, the bit sequence B2 transmitted on the second time-frequency resource region includes terminal identity identification information or transmitter identity identification information; or includes terminal identity identification information and at least one of the following information: cell identification information, signaling information and data information; or includes transmitter identity identification information and at least one of the following information: cell identification information, signaling information and data.

In one embodiment, the signaling information includes a buffer status report for the transmitter, or includes scheduling request information for the transmitter, or includes the system parameter information associated with the current transmission process.

In one embodiment, a way to divide the second time-frequency resource region into K2 sub-resource pools includes orthogonal division;

Wherein, the orthogonal division includes frequency domain orthogonal division, time domain orthogonal division, code domain orthogonal division, and orthogonal division formed based on mixed use of frequency domain orthogonal division, the time domain orthogonal division and the code domain orthogonal division.

In one embodiment, the first index value Index1 is determined based on W1 bits in the bit sequence B, or is determined based on W1 bits generated from an operation of bits in the bit sequence B;

The second index value Index2 is determined based on W2 bits in the bit sequence B, or is determined based on W2 bits generated from an operation of bits in the bit sequence B;

Wherein, the W1=ceil(log 2(K1)), the W2=ceil(log 2(K2)), the ceil is an operation of rounding up.

In one embodiment, the W1 is greater than or equal to the W2; or, the W1 bits include the W2 bits.

In one embodiment, the W1 bits are selected from the bit sequence B according to system parameter information associated with the current transmission process;

The W2 bits are W2 bits of the W1 bits;

The system parameter information includes at least one of the following information: a system frame number corresponding to the current transmission process, channel information corresponding to the current transmission process, and frequency domain location information corresponding to the current transmission process, and the number of transmissions.

In one embodiment, an operation method of the bit sequence B is determined according to the system parameter information associated with the current transmission process, the W1 bits are generated based on the determined operation method;

The W2 bits are W2 bits of the W1 bits;

The system parameter information includes at least one of the following information: a system frame number corresponding to the current transmission process, channel information corresponding to the current transmission process, and frequency domain location information corresponding to the current transmission process, and the number of transmissions.

In one embodiment, the system parameter information is carried in signaling information of the bit sequence B for transmission.

In one embodiment, the transmitter further includes a first processing unit 1503, which is configured to modulate the transmission signals generated based on the bit sequence B to the first time-frequency resource region for transmission by using carrier modulation; and modulate the transmission signals generated based on the bit sequence B2 to the Index2-th sub-resource pool for transmission by using carrier modulation.

A process of generating the transmission signals based on the bit sequence B includes a symbol spreading process, and the symbol spreading process is performed before or after the step of carrier modulation.

In one embodiment, the symbol spreading process is performed prior to the step of carrier modulation; correspondingly, the first processing unit is further configured to form the bit sequence B into modulation symbols by cyclic redundancy check CRC coding, channel forward error correction FEC coding, and digital amplitude and phase modulation, spread the modulation symbols by using the Index1-th sequence, and modulate the modulation symbols to the first time-frequency resource region by using orthogonal frequency division multiplexing OFDM or single-carrier frequency division multiplexing SC-FDMA/Discrete Fourier spread single carrier orthogonal frequency division multiplexing DFT-S-OFDM carrier modulation technology;

Or, the symbol spreading process is performed after the step of the carrier modulation, correspondingly, the first processing unit is further configured to form the bit sequence B into modulation symbols by cyclic redundancy check CRC coding, channel forward error correction FEC coding, and digital amplitude and phase modulation, modulate the modulation symbols by using orthogonal frequency division multiplexing OFDM or single-carrier frequency division multiplexing SC-FDMA/Discrete Fourier spread single carrier orthogonal frequency division multiplexing DFT-S-OFDM carrier modulation technology, and spread the modulated modulation symbols by using the Index1-th sequence, and modulate to the first time-frequency resource region.

In one embodiment, in the step of generating the transmission signals based on the bit sequence B, after the step of forming the modulation symbols, and before the transmission signals generated based on the bit sequence B is transmitted, the first processing unit is further configured to insert a pilot symbol.

In one embodiment, in the step of generating the transmission signals based on the bit sequence B, after the step of performing the cyclic redundancy check CRC coding, and before the step of performing the channel forward error correction FEC coding, the first processing unit is further configured to scramble the bit sequence B by using a scrambling code associated with the cell identification information;

Or, after the step of performing the channel forward error correction FEC coding, and before the step of performing the digital amplitude and phase modulation, the first processing unit is further configured to scramble the bit sequence, which is encoded by the channel forward error correction FEC coding, by using a scrambling code associated with the cell identification information.

In one embodiment, the first processing unit is further configured to form the bit sequence B2 into modulation symbols by cyclic redundancy check CRC coding, channel forward error correction FEC coding, and digital amplitude and phase modulation, the Index2-th sub-resource pool is selected, and modulate the modulation symbols to the Index2-th sub-resource pool by using orthogonal frequency division multiplexing OFDM or single-carrier frequency division multiplexing SC-FDMA/Discrete Fourier spread single carrier orthogonal frequency division multiplexing DFT-S-OFDM carrier modulation technology;

In one embodiment, in the step of generating the transmission signals based on the bit sequence B2, after the step of forming the modulation symbols, and before the step of selecting the Index2-th sub-resource pool, the first processing unit is further configured to insert a pilot symbol.

In one embodiment, in the step of generating the transmission signals based on the bit sequence B2, after the step of performing the cyclic redundancy check CRC coding, and before the step of performing the digital amplitude and phase modulation, the first processing unit is further configure to scramble the bit sequence B2 by using a scrambling code associated with the cell identification information; and/or, subtract the bits in the bit sequence B2 that determines the second index value Index2.

In one embodiment, the spreading sequence is the Index-th sequence in a sequence set containing K1 spreading sequences, the sequence set containing K1 spreading sequences is generated by sequence point-wise multiplication based on the first sequence set and the second sequence set; or by replacing the non-zero elements of each sequence in the second sequence set with sequence elements generated by sequence point-wise multiplication of a sequence consisting of non-zero elements in the each sequence and a sequence in the first sequence set; the Index is determined by the Bc bits generated by the bit sequence B corresponding to the transmission information; wherein, point-wise multiplication operation of two sequence is the multiplication of elements in the same position of two sequences. Here, the relevant content of the specific spreading sequence is referred to the first embodiment, and details are not described herein again.

It should be noted here that the description of the above embodiment of the transmitter is similar to the description of the above method, and has the same advantageous effects as the method embodiment, and without superfluous illustration. For the technical details that are not disclosed in the transmitter embodiment of the present disclosure, those skilled in the art could understand by referring to the description of the method embodiment of the present disclosure, and in order to save space, it will not be repeated.

Here, in practical applications, the first processing unit 1503 may be specifically implemented by a processor, the processor may be a central processing unit (CPU), a microprocessor (MPU), a digital signal processor (DSP), a field programmable gate array (FPGA), or the like; the first sending unit 1501 and the second sending unit 1502 may be specifically implemented by a transmitter.

The Fourth Embodiment

Figure 16:
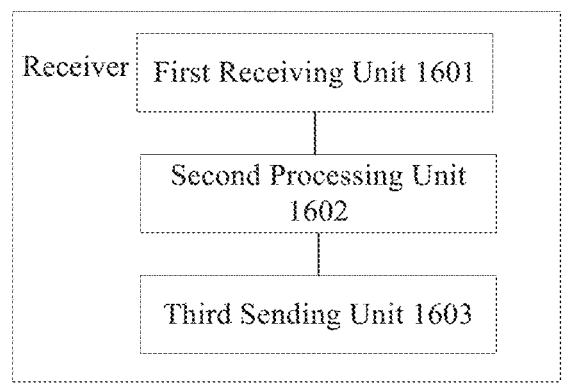
FIG. 16 is the structural sketch of the composition of a receiver of present disclosure.

This embodiment provides a receiver. As shown in FIG. 16, the receiver includes a first receiving unit 1601, a second processing unit 1602 and a third sending unit 1603.

The first receiving unit 1601 is configured to receive the transmission signals transmitted by at least one of transmitters on a first time-frequency resource region and a second time-frequency resource region;

The second processing unit 1602 is configured to extract the bit sequence B and the bit sequence B2 corresponding to each of the transmitters based on transmission signals transmitted by each of the transmitters on the first time-frequency resource region and the second time-frequency resource region; and determine feedback information for each of the transmitters based on reconstructed signals of the bit sequence B and/or the bit sequence B2 corresponding to each of the transmitters;

The third sending unit 1603 is configured to transmit the feedback information for each of the transmitters;

The feedback information includes at least terminal identity identification information, uplink synchronization alignment timing advance TA information, and a temporary identifier allocated to a cell where a terminal locates after contention resolution; or, at least includes terminal identity identification information, uplink synchronization alignment timing advance TA information, a temporary identifier allocated to a cell where a terminal locates after contention resolution, and uplink grant assigned for subsequent data of the transmitter; or, at least includes terminal identity identification information and an acknowledgement ACK/negative acknowledgement NACK; or, at least includes terminal identity identification information and an acknowledgement ACK/negative acknowledgement NACK, a temporary identifier allocated to a cell where a terminal locates after contention resolution, and uplink grant assigned for subsequent data of the transmitter.

In one embodiment, the temporary identifier is generated based on bits directly indicated by the receiver; or is partial bits of bits in the terminal identity identification information indicated by signaling bits; or is bits generated based on the terminal identity identification information indicated by the signaling bit.

In one embodiment, the third sending unit 1603 is further configured to transmit the feedback information for each of the transmitters directly through a physical downlink control channel PDCCH; or, transmit the feedback information for each of the transmitters through a physical downlink shared data channel PDSCH indicated by a physical downlink control channel PDCCH.

In one embodiment, the second processing unit 1602 is further configured to scramble the PDCCH by a Radio Network Temporary Identifier RNTI; wherein, the RNTI is a preset identifier, or is a partial identifier taken from the terminal identity identification information.

It should be noted here that the description of the above embodiment of the receiver is similar to the description of the above method, and has the same advantageous effects as the method embodiment, and without superfluous illustration. For the technical details that are not disclosed in the receiver embodiment of the present disclosure, those skilled in the art could understand by referring to the description of the method embodiment of the present disclosure, and in order to save space, it will not be repeated.

Here, in practical applications, the second processing unit 1602 may be specifically implemented by a processor, the processor may be a central processing unit (CPU), a microprocessor (MPU), a digital signal processor (DSP), a field programmable gate array (FPGA), or the like; the first receiving unit 1601 may be specifically implemented by a receiver, and the third sending unit 1603 may be specifically implemented by a transmitter.

The Fifth Embodiment

Figure 17:
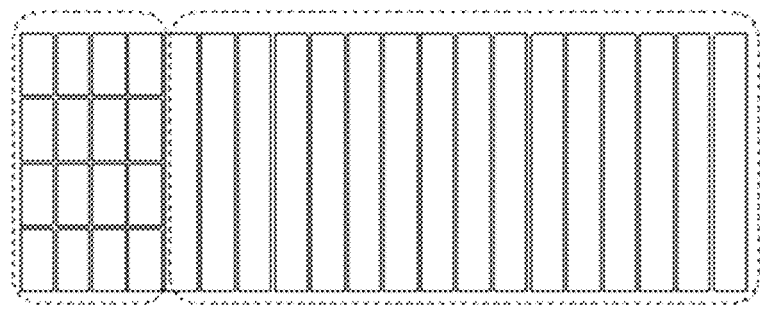
FIG. 17 to FIG. 18 are schematic diagrams of concrete application according to the fifth embodiment of present disclosure.
Figure 18:
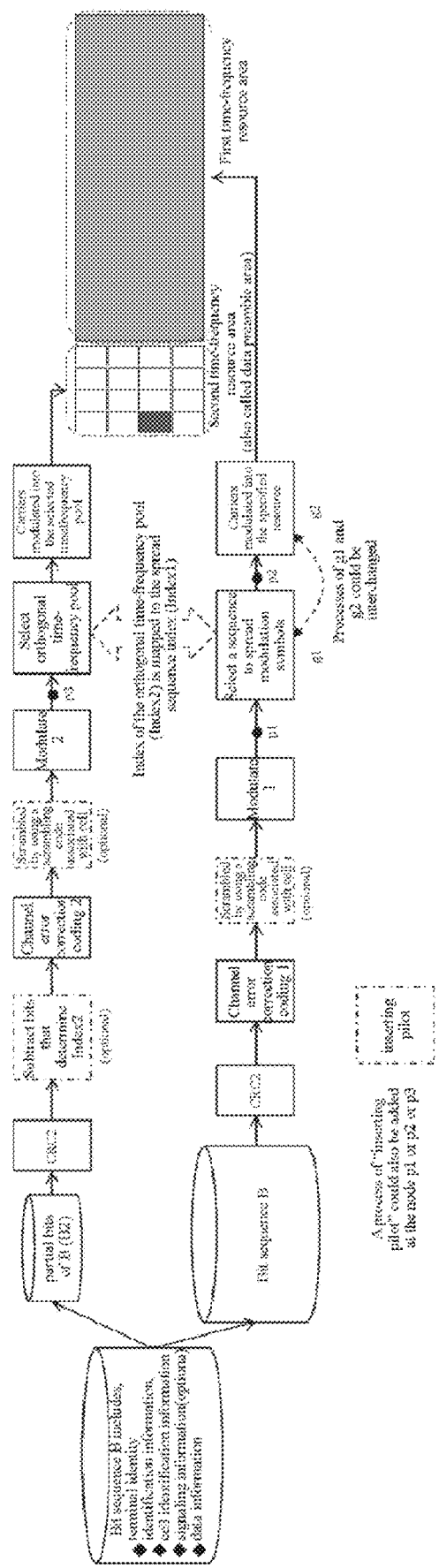

As shown in FIG. 17 and FIG. 18, this embodiment provides a method of generation and transmission based on data preamble.

A first time-frequency resource region occupies 180 kHz bandwidth and 16 ms duration, by performing OFDM modulation with 15 KHz subcarrier spacing configured by LTE, there are 12 subcarriers (one PRB of LTE) and 16 TTIs in the first time-frequency resource region.

A second time-frequency resource region occupies 180 kHz bandwidth and 4 ms duration, by performing OFDM modulation with 15 KHz subcarrier spacing configured by LTE, there are 12 subcarriers (one PRB of LTE) and 4 TTIs in the second time-frequency resource region.

After BPSK/QPSK modulation, information in the first time-frequency resource region occupies 4 PRBs, and then symbols generated based on spread by using 4 long sequences are transmitted over 16 PRBs. The 4 long spreading sequences are selected from a set including 64 sequences, and 6 bits generated from the bit sequence B determine which sequence is selected, that is, the 6 bits generated from the bit sequence B determine Index1.

A pilot may be further inserted in the modulation symbols (optional); the coded bits (CRC1/channel error correction coding 1) may be further added with scrambling operation related to cell identity scrambling code (optional). Here, symbol spreading could be performed before or after carrier modulation.

Further, the second time-frequency resource region is divided into 16 sub-regions by orthogonal time-frequency hybrid division, and each sub-region occupies 1 ms (3 subcarriers per sub-region), that is, each sub-area has a total of 3*14=42 REs and could carry 42 BPSK/QPSK modulation symbols.

Specific 4 bits of the 6 bits described above which determine the Index1 determine which sub-area to select, and signals generated from partial bits of B are transmitted in this selected sub-area.

A pilot may be further inserted in the modulation symbols (optional); the coded bits (CRC2/channel error correction coding 2) may be further added with scrambling operation related to cell identity scrambling code (optional).

In this embodiment, the bit sequence B transmitted in the first time-frequency resource region includes the terminal identity identification information, cell identification information and data information, and may further include signaling information, such as a "Buffer Status Report (BSR)".

B2 transmitted in the second time-frequency resource area sub-area includes terminal identity identification information, cell identification information, and a Buffer Status Report (BSR).

After B2 bits are performed CRC2, bits of Index2 could be subtracted to improve efficiency.

Other Parameters

| | |
|---|---|
| Carrier Modulation Mode | OFDM |
| Subcarrier Spacing | 15 KHz |
| Spreading Sequence | Length: 4 |
| | Set Size: 64 |
| | Element Value Range: [1, −1, j, −j, 0] |
| | Sequence Index: determined by 6 bits of UE_ID |
| | (The 6 bits not involved in FEC coding) |
| CRC1 Coding Polynomial | 24 Long LTE |
| FEC1 | LTE Convolutional Code, 1/2 Coding |
| Modulation 1 | BPSK |
| CRC2 Coding Polynomial | 12 Long CRC |
| FEC1 | LTE Convolutional Code, 1/2 Coding |
| Modulation 2 | BPSK |

Reception of Base Station:

After multi-user detection, the bit sequence B of each user is decoded, and feedback is performed for the B. Here, SIC technology may be used in multi-user detection, that is, signals of the user decoded successfully are reconstructed, and cancelled, and then the remaining user information is demodulated and decoded. One of steps of reconstruction is required to be re-spread, and the spreading sequence is determined by 6 bits of the B. Signals of the second time-frequency resource region could simplify multi-user detection of the receiver.

The Sixth Embodiment

Figure 19:
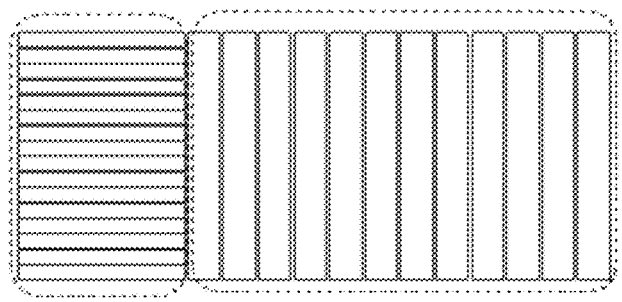
FIG. 19 to FIG. 21 are schematic diagrams of concrete application according to the sixth embodiment of present disclosure.
Figure 20:
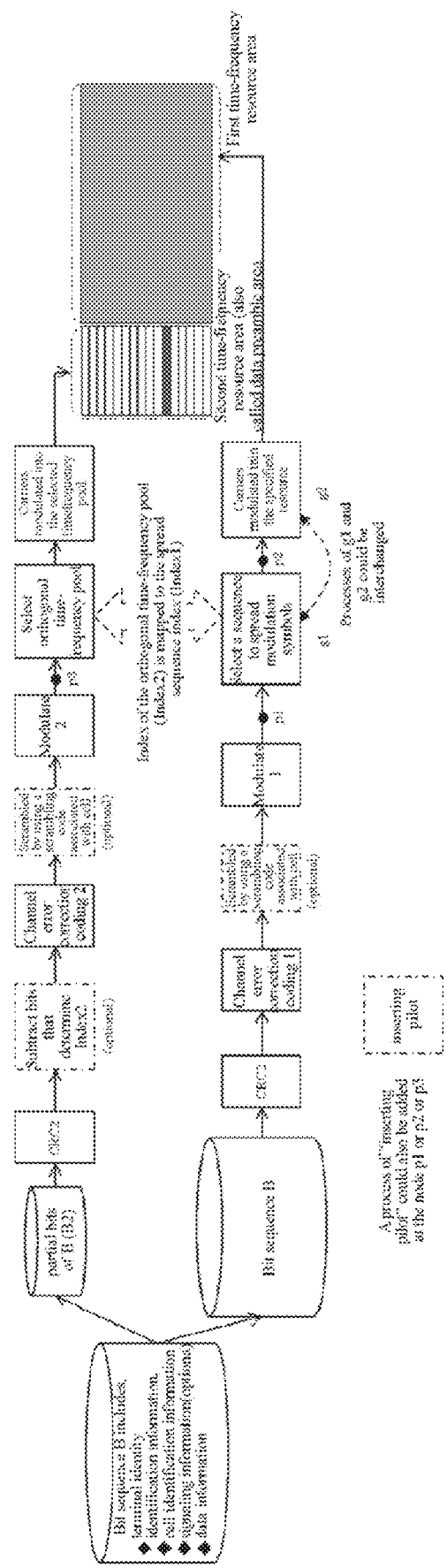
Figure 21:
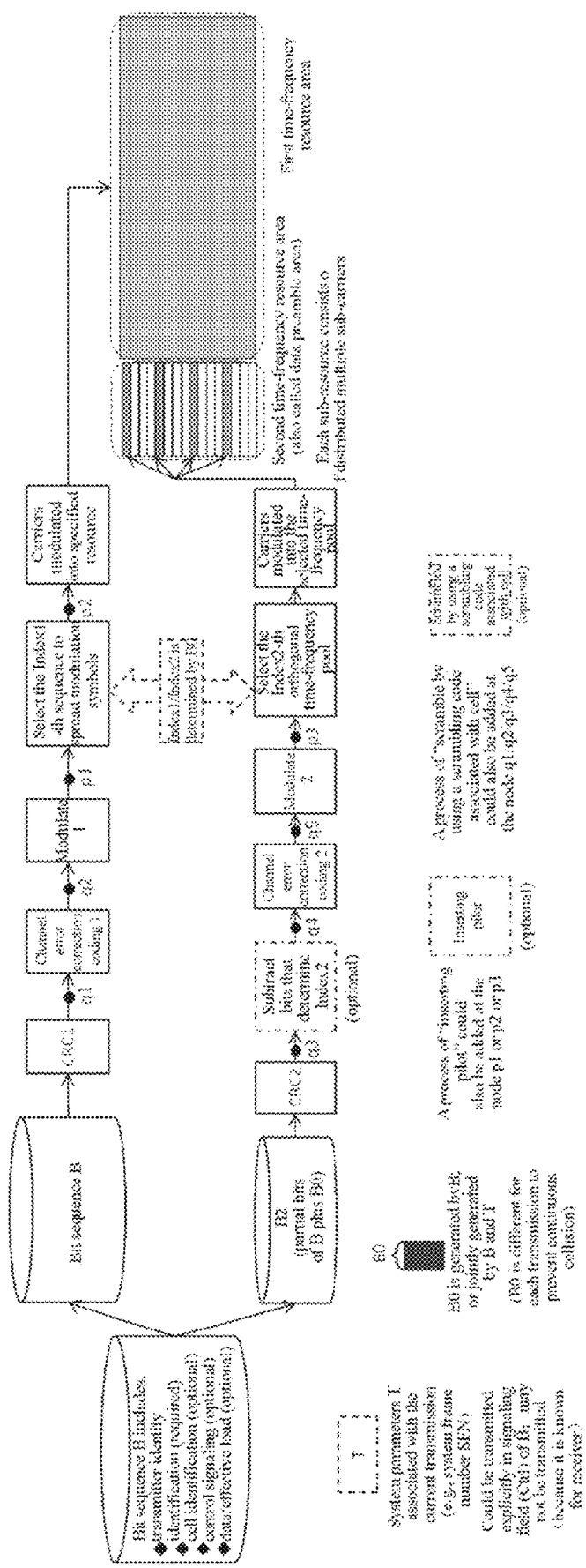

As shown in FIG. 19 and FIG. 21, this embodiment provides a method of generation and transmission based on data preamble.

A first time-frequency resource region occupies 180 kHz bandwidth and 12 ms duration, by performing OFDM modulation with 15 KHz subcarrier spacing configured by LTE, there are 12 subcarriers (one PRB of LTE) and 12 TTIs in the first time-frequency resource region.

A second time-frequency resource region occupies 180 kHz bandwidth and 4 ms duration. By performing OFDM modulation with 3075 KHz subcarrier spacing, there are 48 subcarriers in the second time-frequency resource region.

After BPSK/QPSK modulation, information in the first time-frequency resource region occupies 3 PRBs, and then symbols generated based on spread by using 4 long sequences are transmitted over 12 PRBs. The 4 long spreading sequences are selected from a set including 32 sequences, and 5 bits generated from the bit sequence B determine which sequence is selected, that is, the 5 bits generated from the bit sequence B determine Index1.

A pilot may be further inserted in the modulation symbols (optional); the coded bits (CRC1l/channel error correction coding 1) may be further added with scrambling operation related to cell identity scrambling code (optional). Here, symbol spreading could be performed before or after carrier modulation.

Further, the second time-frequency resource region is divided into 16 sub-regions by orthogonal time-frequency hybrid division, and each sub-region occupies 4 ms (3 subcarriers per sub-region), that is, each sub-area has a total of 3*14=42 REs and could carry 42 BPSK/QPSK modulation symbols.

Specific 4 bits of the 5 bits described above which determine the Index1 determine which sub-area to select, and signals generated from partial bits of B are transmitted in this selected sub-area.

A pilot may be further inserted in the modulation symbols (optional); the coded bits (CRC2/channel error correction coding 2) may be further added with scrambling operation related to cell identity scrambling code (optional).

In this embodiment, the bit sequence B transmitted in the first time-frequency resource region includes the terminal identity identification information, cell identification information and data information, and may further include signaling information, such as "Schedule Request (SR)" information; B2 transmitted in the second time-frequency resource area sub-area includes terminal identity identification information, cell identification information, and "Schedule Request (SR)" information; after B2 bits are performed CRC2, bits of Index2 could be subtracted to improve efficiency.

Other Parameters

| | |
|---|---|
| Carrier Modulation Mode | OFDM |
| Subcarrier Spacing | 15 KHz |
| Spreading Sequence | Length: 4 |
| | Set Size: 64 |
| | Element Value Range: [1, −1, j, −j] |
| | Sequence Index: determined by 6 bits of UE_ID |
| | (The 6 bits not involved in FEC coding) |
| CRC1 Coding Polynomial | 24 Long LTE |
| FEC1 | LTE Turbo, 1/2 Coding |
| Modulation 1 | BPSK |
| CRC2 Coding Polynomial | 12 Long CRC |
| FEC1 | LTE Convolutional Code, 1/2 Coding |
| Modulation 2 | BPSK |

Reception of Base Station:

After multi-user detection, the bit sequence B of each user is decoded, and feedback is performed for the B.

SIC technology may be used in multi-user detection, that is, signals of the user decoded successfully are reconstructed, and cancelled, and then the remaining user information is demodulated and decoded. One of steps of reconstruction is required to be re-spread, and the spreading sequence is determined by 6 bits of the B. Signals of the second time-frequency resource region could simplify multi-user detection of the receiver.

The embodiment also provides a transmitter including: a processor and a memory for storing a computer program executable on the processor, wherein, when the computer program is executed by the processor for performing the above methods and steps applied to the transmitter.

The embodiment also provides a receiver including: a processor and a memory for storing a computer program executable on the processor, wherein, when the computer program is executed by the processor for performing the above methods and steps applied to the receiver.

Here, in practical application, the memory described above may be implemented using any type or combination of volatile and non-volatile memory or storage devices. Wherein, the non-volatile memory could be Read Only Memory (ROM), Programmable Read-Only Memory (PROM), Erasable Programmable Read-Only Memory (EPROM), Electrically Erasable Programmable Read-Only Memory (EEPROM), Ferromagnetic Random Access Memory (FRAM), flash memory, magnetic surface memory, optical disk, or Compact Disc Read-Only Memory (CD-ROM); the magnetic surface memory can be a disk memory or a tape memory. The volatile memory could be Random Access Memory (RAM), which acts as external cache memory. By way of illustration and not limitation, RAM is available in many forms such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), or Direct Rambus Random Access Memory (DRRAM). The memory of the disclosed embodiments are intended to comprise, without being limited to, these and any other suitable types of memory.

The processor may be an integrated circuit chip having a capability to process signal. In the implementation process, each step of the above method may be completed by an integrated logic circuit of hardware in the processor or an instruction in a form of software. The above processor may be a general purpose processor, a digital signal processor (DSP), other programmable logic devices, discrete gates, transistor logic devices, or discrete hardware components, etc. The processor may implement or perform the disclosed methods, steps, and logic blocks in the embodiments of the present disclosure. The general purpose processor can be a microprocessor or any conventional processor, etc. The steps of a method or algorithm described in the embodiment of the present disclosure may be implemented directly as a hardware decoding processor, or may be performed by a combination of hardware and software modules in the decoding processor. The software module can be located in storage medium, the storage medium is located in the memory, the processor reads the information in the memory, and completes the steps of the foregoing methods in combination with the hardware thereof.

Here, it is noted that the computer readable storage medium described above in this embodiment may be a memory such as FRAM, ROM, programmable read only memory PROM, EPROM, EEPROM, flash memory, magnetic surface memory, optical disk, or CD-ROM, etc. The memory may also be a variety of apparatus including one or any combination of the above memories.

Those skilled in the art shall understand that the embodiments of the present disclosure may be provided as method, system or computer program product. Accordingly, the present disclosure may take the form of a hardware embodiment, a software embodiment or an embodiment combining software and hardware aspects. Moreover, this disclosure can use the form of the product of computer programs to be carried out on one or multiple storage media (including but not limit to disk memory, and optical memory etc.) comprising programming codes that can be executed by computers.

The present disclosure are described with reference to flowchart and/or block diagrams of methods, apparatus (systems) and computer program products according to embodiments of the disclosure. Each of processes and/or blocks in flowcharts and/or block diagrams, and the combinations of the flows and/or blocks in the flowcharts and/or block diagrams can be implemented by computer program instructions. These computer commands can be provided to a general-purpose computer, a specialized computer, an embedded processor, or the processor of other programmable data equipment so as to give rise to a machine with the result that the commands executed through the computer or processor of other programmable data processing equipment give rise to a device that is used to realize the functions designated by one or more processes in a flow chart and/or one or more blocks in a block diagram.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the one or multiple flows in the flowchart and/or the functions specified in one block or multiple blocks of the block diagram.

Such computer program commands can also be loaded on computers or other programmable data processing equipment so as to carry out a series of operation steps on computers or other programmable equipment to generate the process to be achieved by computers, so that the commands to be executed by computers or other programmable equipment achieve the steps of functions specified in one or multiple flows in the flowchart and/or one block or multiple blocks of the block diagram.

The above are only preferred embodiments of the present disclosure and are not intended to limit the present disclosure.

INDUSTRIAL APPLICABILITY

By optimizing the structure of the random access frame, the embodiments of the present disclosure could reduce the delay and overhead of the two scenarios of random access and small packet data transmission effectively, at the same time, implementation of the transmitter and the receivers could be simplified, the blind detection efficiency of the receiver and the success rate of blind detection could be improved, moreover, the method described in the embodiments of the present disclosure has excellent robust performance.

What is claimed is:
1. A data transmission method, the method comprising:
transmitting, by a transmitter, transmission signals, that are generated from a bit sequence B using at least a symbol spreading technology, on a first time-frequency resource region; wherein, a spreading sequence used by the symbol spreading technology is an Index1-th sequence in a sequence set containing K1 spreading sequences, and the Index1-th represents a first index value; and using, by the transmitter, partial bits of the bit sequence B and a bit sequence B0 as a bit sequence B2, and transmitting transmission signals generated based on the bit sequence B2 on an Index2-th sub-resource pool in a second time-frequency resource region containing K2 sub-resource pools; the Index2-th representing a second index value; wherein, a first index value Index1 and a second index value Index2 are both determined by the bit sequence B0; and the bit sequence B0 is determined according to the bit sequence B, or is determined jointly according to the bit sequence B and system parameter information associated with current transmission process.

2. The method of claim 1, wherein, the bit sequence B transmitted on the first time-frequency resource region comprises terminal identity identification information or transmitter identity identification information; or comprises the terminal identity identification information and at least one of following information: cell identification information, signaling information and data information; or comprises the transmitter identity identification information and at least one of the following information: the cell identification information, the signaling information and the data information.

3. The method of claim 1, wherein, the system parameter information comprises at least one of following information: a system frame number corresponding to the current transmission process, channel information corresponding to the current transmission process, and frequency domain location information corresponding to the current transmission process, and number of transmissions.

4. The method of claim 1, wherein, the bit sequence B2 transmitted on the second time-frequency resource region comprises the partial bits of the bit sequence B and the bit sequence B0 that determines the first index value Index1 and the second index value Index2.

5. The method of claim 1, wherein, the bit sequence B2 transmitted on the second time-frequency resource region comprises terminal identity identification information or transmitter identity identification information; or comprises the terminal identity identification information and at least one of following information: cell identification information, signaling information and data information; or comprises the transmitter identity identification information and at least one of the following information: the cell identification information, the signaling information and the data information.

6. The method of claim 2, wherein, the signaling information comprises a buffer status report for the transmitter, or comprises scheduling request information for the transmitter, or comprises the system parameter information associated with the current transmission process.

7. The method of claim 1, wherein, a way to divide the second time-frequency resource region into K2 sub-resource pools comprises orthogonal division;

wherein, the orthogonal division comprises frequency domain orthogonal division, time domain orthogonal division, code domain orthogonal division, and orthogonal division formed based on mixed use of the frequency domain orthogonal division, the time domain orthogonal division and the code domain orthogonal division.

8. The method of claim 1, wherein, the first index value Index1 is determined based on W1 bits in the bit sequence B, or is determined based on W1 bits generated from an operation of bits in the bit sequence B; and the second index value Index2 is determined based on W2 bits in the bit sequence B, or is determined based on W2 bits generated from the operation of bits in the bit sequence B;

wherein, the W1=ceil(log 2(K1)), the W2=ceil(log 2(K2)), the ceil is an operation of rounding up.

9. The method of claim 1, wherein, the spreading sequence is an Index-th sequence in the sequence set containing K1 spreading sequences, the sequence set containing K1 spreading sequences is generated by sequence point-wise multiplication based on a first sequence set and a second sequence set; or by replacing non-zero elements of each sequence in the second sequence set with sequence elements generated by sequence point-wise multiplication of a sequence consisting of non-zero elements in the each sequence and a sequence in the first sequence set; and Index is determined by Bc bits generated by the bit sequence B corresponding to transmission information; wherein, point-wise multiplication operation of two sequence is multiplication of elements in a same position of two sequences.

10. A data transmission method, the method comprising: receiving, by a receiver, transmission signals transmitted by at least one of transmitters on a first time-frequency resource region and a second time-frequency resource region, and extracting bit sequence B and bit sequence B2 corresponding to each of the transmitters based on the transmission signals transmitted by each of the transmitters on the first time-frequency resource region and the second time-frequency resource region; and determining feedback information for each of the transmitters based on reconstructed signals of the bit sequence B and/or the bit sequence B2 corresponding to each of the transmitters, and transmitting the feedback information for each of the transmitters; wherein, the feedback information comprises at least terminal identity identification information, uplink synchronization alignment timing advance TA information, and a temporary identifier allocated to a cell where a terminal locates after contention resolution; or, at least comprises the terminal identity identification information, the uplink synchronization alignment timing advance TA information, the temporary identifier allocated to the cell where the terminal locates after the contention resolution, and uplink grant assigned for subsequent data of the transmitter; or, at least comprises the terminal identity identification information and an acknowledgement ACK/negative acknowledgement NACK; or, at least comprises the terminal identity identification information and the acknowledgement ACK/negative acknowledgement NACK, the temporary identifier allocated to the cell where the terminal locates after the contention resolution, and the uplink grant assigned for subsequent data of the transmitter.

11. A transmitter, comprising: a processor and a memory for storing a computer program executable on the processor, wherein, when the computer program is executed by the processor for performing a data transmission method, the method comprising:

transmitting transmission signals, that are generated from a bit sequence B using at least a symbol spreading technology, on a first time-frequency resource region; wherein, a spreading sequence used by the symbol spreading technology is an Index1-th sequence in a sequence set containing K1 spreading sequences, and the Index1-th represents a first index value; and using partial bits of the bit sequence B and a bit sequence B0 as a bit sequence B2, and transmitting transmission signals generated based on the bit sequence B2 on an Index2-th sub-resource pool in a second time-frequency resource region containing K2 sub-resource pools; the Index2-th representing a second index value; wherein, a first index value Index1 and a second index value Index2 are both determined by the bit sequence B0; and the bit sequence B0 is determined according to the bit sequence B, or is determined jointly according to the bit sequence B and system parameter information associated with current transmission process.

12. The transmitter of claim 11, wherein, the bit sequence B transmitted on the first time-frequency resource region comprises terminal identity identification information or transmitter identity identification information; or comprises the terminal identity identification information and at least one of following information: cell identification information, signaling information and data information; or comprises the transmitter identity identification information and at least one of the following information: the cell identification information, the signaling information and the data information.

13. The transmitter of claim 12, wherein, the signaling information comprises a buffer status report for the transmitter, or comprises scheduling request information for the transmitter, or comprises the system parameter information associated with the current transmission process.

14. The transmitter of claim 11, wherein, the system parameter information comprises at least one of following information: a system frame number corresponding to the current transmission process, channel information corresponding to the current transmission process, and frequency domain location information corresponding to the current transmission process, and number of transmissions.

15. The transmitter of claim 11, wherein, the bit sequence B2 transmitted on the second time-frequency resource region comprises the partial bits of the bit sequence B and the bit sequence B0 that determines the first index value Index1 and the second index value Index2.

16. The transmitter of claim 11, wherein, the bit sequence B2 transmitted on the second time-frequency resource region comprises terminal identity identification information or transmitter identity identification information; or comprises the terminal identity identification information and at least one of following information: cell identification information, signaling information and data information; or comprises the transmitter identity identification information and at least one of the following information: the cell identification information, the signaling information and the data information.

17. The transmitter of claim 11, wherein, a way to divide the second time-frequency resource region into K2 sub-resource pools comprises orthogonal division;

wherein, the orthogonal division comprises frequency domain orthogonal division, time domain orthogonal division, code domain orthogonal division, and orthogonal division formed based on mixed use of the frequency domain orthogonal division, the time domain orthogonal division and the code domain orthogonal division.

18. The transmitter of claim 11, wherein, the first index value Index1 is determined based on W1 bits in the bit sequence B, or is determined based on W1 bits generated from an operation of bits in the bit sequence B; and the second index value Index2 is determined based on W2 bits in the bit sequence B, or is determined based on W2 bits generated from the operation of bits in the bit sequence B;

wherein, the $W1=\operatorname{ceil}(\log 2(K1))$, the $W2=\operatorname{ceil}(\log 2(K2))$, the ceil is an operation of rounding up.

19. The transmitter of claim 11, wherein, the spreading sequence is an Index-th sequence in the sequence set containing K1 spreading sequences, the sequence set containing K1 spreading sequences is generated by sequence point-wise multiplication based on a first sequence set and a second sequence set; or by replacing non-zero elements of each sequence in the second sequence set with sequence elements generated by sequence point-wise multiplication of a sequence consisting of non-zero elements in the each sequence and a sequence in the first sequence set; and Index is determined by Bc bits generated by the bit sequence B corresponding to transmission information; wherein, point-wise multiplication operation of two sequence is multiplication of elements in a same position of two sequences.

* * * * *